(12) United States Patent
Khan et al.

(10) Patent No.: US 9,686,183 B2
(45) Date of Patent: Jun. 20, 2017

(54) DIGITAL OBJECT ROUTING BASED ON A SERVICE REQUEST

(75) Inventors: Shabbir Khan, San Jose, CA (US); Alexander Cohen, Mill Valley, CA (US)

(73) Assignee: Zarbaña Digital Fund LLC, Wilmington, DE (US)

( * ) Notice: Subject to any disclaimer, the term of this patent is extended or adjusted under 35 U.S.C. 154(b) by 3743 days.

(21) Appl. No.: 11/295,820

(22) Filed: Dec. 6, 2005

(65) Prior Publication Data

US 2007/0291773 A1    Dec. 20, 2007

(51) Int. Cl.
| | | |
|---|---|---|
| H04L 12/725 | (2013.01) | |
| G06F 9/50 | (2006.01) | |
| H04L 12/715 | (2013.01) | |
| H04L 12/741 | (2013.01) | |
| H04L 29/08 | (2006.01) | |

(52) U.S. Cl.
CPC ............ H04L 45/302 (2013.01); G06F 9/505 (2013.01); H04L 45/04 (2013.01); H04L 45/54 (2013.01); H04L 67/327 (2013.01)

(58) Field of Classification Search
CPC .................................................. H04L 45/302
USPC ........ 370/392, 394, 396, 398, 400, 401, 410
See application file for complete search history.

(56) References Cited

U.S. PATENT DOCUMENTS

| | | | |
|---|---|---|---|
| 4,041,398 A | * | 8/1977 | Ellis .............................. 725/131 |
| 4,339,807 A | | 7/1982 | Uchimura et al. |
| 4,405,829 A | | 9/1983 | Rivest et al. |
| 4,462,473 A | | 7/1984 | Valestin |
| 4,668,758 A | | 5/1987 | Corley |
| 4,827,508 A | | 5/1989 | Shear |
| 4,829,443 A | | 5/1989 | Pintsov et al. |
| 4,885,777 A | | 12/1989 | Takaragi et al. |
| 4,959,795 A | | 9/1990 | Christensen et al. |
| 4,975,830 A | | 12/1990 | Gerpheide et al. |
| 4,977,594 A | | 12/1990 | Shear |
| 4,995,081 A | | 2/1991 | Leighton et al. |
| 4,995,082 A | | 2/1991 | Schnorr |
| 5,050,213 A | | 9/1991 | Shear |
| 5,101,437 A | | 3/1992 | Plamondon |
| 5,111,512 A | | 5/1992 | Fan et al. |
| 5,195,133 A | | 3/1993 | Kapp et al. |
| 5,202,930 A | | 4/1993 | Livshitz et al. |

(Continued)

FOREIGN PATENT DOCUMENTS

| | | |
|---|---|---|
| CN | 1650578 | 8/2005 |
| EP | 0982901 | 3/2000 |

(Continued)

OTHER PUBLICATIONS

Terms and conditions of the extended download warranty for digital products purchased on the Symantec Store, Jun. 27, 2005.

(Continued)

*Primary Examiner* — Andrew Lai
*Assistant Examiner* — Andrew C Lee
(74) *Attorney, Agent, or Firm* — Meyertons, Hood, Kivlin, Kowert & Goetzel, P.C.

(57) ABSTRACT

A digital object may be routed via a network. Routing of a digital object may be based in part on a requested service, and/or on an ability of an intermediate node to provide the requested service, and/or on a willingness of the intermediate node to provide the requested service.

41 Claims, 10 Drawing Sheets

(56) References Cited

U.S. PATENT DOCUMENTS

| | | | |
|---|---|---|---|
| 5,203,263 A | 4/1993 | Berger et al. | |
| 5,222,138 A | 6/1993 | Balabon et al. | |
| 5,280,527 A | 1/1994 | Gullman et al. | |
| 5,337,358 A | 8/1994 | Axelrod et al. | |
| 5,359,508 A | 10/1994 | Rossides | |
| 5,383,129 A | 1/1995 | Farrell | |
| 5,386,369 A | 1/1995 | Christiano | |
| 5,410,598 A | 4/1995 | Shear | |
| 5,434,928 A | 7/1995 | Wagner et al. | |
| 5,465,299 A | 11/1995 | Matsumoto et al. | |
| 5,487,100 A | 1/1996 | Kane | |
| 5,490,217 A | 2/1996 | Wang et al. | |
| 5,557,320 A | 9/1996 | Krebs | |
| 5,592,477 A | 1/1997 | Farris et al. | |
| 5,719,942 A | 2/1998 | Aldred et al. | |
| 5,727,156 A | 3/1998 | Herr-Hoyman et al. | |
| 5,790,642 A | 8/1998 | Taylor et al. | |
| 5,801,753 A | 9/1998 | Eyer et al. | |
| 5,838,920 A * | 11/1998 | Rosborough | 709/224 |
| 5,854,897 A * | 12/1998 | Radziewicz et al. | 709/224 |
| 5,909,595 A | 6/1999 | Rosenthal et al. | |
| 5,995,503 A | 11/1999 | Crawley et al. | |
| 6,006,264 A | 12/1999 | Colby et al. | |
| 6,044,075 A | 3/2000 | Le Boudec et al. | |
| 6,047,313 A * | 4/2000 | Hashimoto et al. | 709/203 |
| 6,073,176 A | 6/2000 | Baindur et al. | |
| 6,073,716 A | 6/2000 | Ellertson et al. | |
| 6,081,591 A | 6/2000 | Skoog | |
| 6,134,589 A | 10/2000 | Hultgren | |
| 6,141,325 A | 10/2000 | Gerstel | |
| 6,157,648 A * | 12/2000 | Voit et al. | 370/401 |
| 6,163,807 A | 12/2000 | Hodgkinson et al. | |
| 6,199,054 B1 | 3/2001 | Khan et al. | |
| 6,289,371 B1 | 9/2001 | Kumpf et al. | |
| 6,314,093 B1 | 11/2001 | Mann et al. | |
| 6,366,575 B1 | 4/2002 | Barkan et al. | |
| 6,400,681 B1 | 6/2002 | Bertin et al. | |
| 6,400,687 B1 | 6/2002 | Davison et al. | |
| 6,426,948 B1 * | 7/2002 | Bowman-Amuah | 370/260 |
| 6,487,172 B1 | 11/2002 | Zonoun | |
| 6,522,735 B1 | 2/2003 | Fortman et al. | |
| 6,529,958 B1 | 3/2003 | Oba et al. | |
| 6,538,991 B1 | 3/2003 | Kodialam et al. | |
| 6,563,793 B1 | 5/2003 | Golden et al. | |
| 6,580,721 B1 | 6/2003 | Beshai | |
| 6,631,132 B1 | 10/2003 | Sourani | |
| 6,683,874 B1 | 1/2004 | Nagami et al. | |
| 6,687,230 B1 | 2/2004 | Furutono et al. | |
| 6,687,247 B1 | 2/2004 | Wilford et al. | |
| 6,765,921 B1 | 7/2004 | Stacey et al. | |
| 6,778,493 B1 | 8/2004 | Ishii | |
| 6,901,445 B2 * | 5/2005 | McCanne et al. | 709/225 |
| 6,947,390 B2 | 9/2005 | Hundscheidt et al. | |
| 6,970,939 B2 * | 11/2005 | Sim | 709/236 |
| 6,973,057 B1 | 12/2005 | Forslow | |
| 6,975,594 B1 | 12/2005 | Byers | |
| 6,977,930 B1 | 12/2005 | Epps et al. | |
| 6,981,029 B1 * | 12/2005 | Menditto et al. | 709/217 |
| 6,981,032 B2 * | 12/2005 | Boivie et al. | 709/219 |
| 6,985,960 B2 | 1/2006 | Takashima et al. | |
| 7,068,600 B2 | 6/2006 | Cain | |
| 7,079,538 B2 | 7/2006 | Gazsi et al. | |
| 7,162,539 B2 * | 1/2007 | Garcie-Luna-Aceves | 709/242 |
| 7,164,665 B2 | 1/2007 | Tourunen | |
| 7,177,832 B1 | 2/2007 | Semret et al. | |
| 7,206,850 B2 | 4/2007 | Ogawa | |
| 7,212,975 B2 * | 5/2007 | Bantz et al. | 705/10 |
| 7,260,598 B1 * | 8/2007 | Liskov et al. | 709/201 |
| 7,269,185 B2 | 9/2007 | Kirkby et al. | |
| 7,289,817 B2 | 10/2007 | Chun | |
| 7,415,268 B2 | 8/2008 | Trossen | |
| 7,418,518 B2 * | 8/2008 | Grove et al. | 709/238 |
| 7,472,274 B2 | 12/2008 | Moreaux et al. | |
| 7,526,646 B2 | 4/2009 | Fukuda et al. | |
| 7,558,859 B2 | 7/2009 | Kasiolas et al. | |
| 7,616,661 B2 | 11/2009 | Park et al. | |
| 7,734,730 B2 * | 6/2010 | McCanne | 709/219 |
| 2001/0027449 A1 | 10/2001 | Wright | |
| 2001/0029479 A1 | 10/2001 | Watanabe | |
| 2001/0049730 A1 | 12/2001 | Brendes et al. | |
| 2001/0053696 A1 | 12/2001 | Pillai et al. | |
| 2002/0002602 A1 * | 1/2002 | Vange et al. | 709/219 |
| 2002/0004843 A1 | 1/2002 | Andersson et al. | |
| 2002/0015386 A1 | 2/2002 | Kajiwara | |
| 2002/0048483 A1 | 4/2002 | Altonen et al. | |
| 2002/0059624 A1 | 5/2002 | Machida et al. | |
| 2002/0059625 A1 | 5/2002 | Kurauchi | |
| 2002/0064149 A1 | 5/2002 | Elliott et al. | |
| 2002/0069179 A1 | 6/2002 | Slater et al. | |
| 2002/0071389 A1 | 6/2002 | Seo | |
| 2002/0124111 A1 | 9/2002 | Desai et al. | |
| 2002/0150041 A1 | 10/2002 | Reinshmidt et al. | |
| 2002/0180781 A1 | 12/2002 | Cezeaux et al. | |
| 2002/0188562 A1 * | 12/2002 | Igarashi et al. | 705/40 |
| 2002/0196461 A1 | 12/2002 | Hanna et al. | |
| 2003/0005049 A1 | 1/2003 | Ogawa | |
| 2003/0005148 A1 | 1/2003 | Mochizuki et al. | |
| 2003/0016679 A1 | 1/2003 | Adams et al. | |
| 2003/0018539 A1 | 1/2003 | La Poutre et al. | |
| 2003/0036970 A1 | 2/2003 | Brustoloni | |
| 2003/0059762 A1 | 3/2003 | Fujiwara et al. | |
| 2003/0088529 A1 | 5/2003 | Klinker et al. | |
| 2003/0093520 A1 | 5/2003 | Beesley | |
| 2003/0105960 A1 | 6/2003 | Takatori et al. | |
| 2003/0140144 A1 | 7/2003 | Raguram et al. | |
| 2003/0147400 A1 | 8/2003 | Devi | |
| 2003/0200439 A1 | 10/2003 | Moskowitz | |
| 2003/0202469 A1 | 10/2003 | Cain | |
| 2003/0210686 A1 | 11/2003 | Terrell et al. | |
| 2003/0212827 A1 | 11/2003 | Saha et al. | |
| 2004/0008689 A1 | 1/2004 | Westphal et al. | |
| 2004/0019901 A1 | 1/2004 | Spio | |
| 2004/0032856 A1 | 2/2004 | Sandstrom | |
| 2004/0052259 A1 | 3/2004 | Garcia et al. | |
| 2004/0064692 A1 | 4/2004 | Kahn et al. | |
| 2004/0105446 A1 | 6/2004 | Park et al. | |
| 2004/0111308 A1 | 6/2004 | Yakov | |
| 2004/0114605 A1 | 6/2004 | Karaoguz et al. | |
| 2004/0172373 A1 | 9/2004 | Chen | |
| 2004/0192324 A1 | 9/2004 | Rudkin | |
| 2004/0199472 A1 | 10/2004 | Dobbins | |
| 2004/0213224 A1 | 10/2004 | Goudreau | |
| 2004/0236957 A1 | 11/2004 | Durand et al. | |
| 2004/0246372 A1 | 12/2004 | Megeid | |
| 2004/0261116 A1 * | 12/2004 | Mckeown et al. | 725/109 |
| 2005/0002354 A1 | 1/2005 | Kelly et al. | |
| 2005/0037787 A1 | 2/2005 | Bachner et al. | |
| 2005/0038707 A1 | 2/2005 | Roever et al. | |
| 2005/0038724 A1 | 2/2005 | Roever et al. | |
| 2005/0044016 A1 | 2/2005 | Irwin et al. | |
| 2005/0135234 A1 | 6/2005 | Saleh et al. | |
| 2005/0135379 A1 | 6/2005 | Callaway et al. | |
| 2005/0152355 A1 | 7/2005 | Henriques | |
| 2005/0152378 A1 | 7/2005 | Bango et al. | |
| 2005/0169270 A1 | 8/2005 | Mutou et al. | |
| 2005/0193114 A1 * | 9/2005 | Colby et al. | 709/226 |
| 2005/0195842 A1 | 9/2005 | Dowling | |
| 2005/0197098 A1 | 9/2005 | Trossen | |
| 2005/0201380 A1 | 9/2005 | Saleh et al. | |
| 2005/0204042 A1 | 9/2005 | Banerjee et al. | |
| 2005/0209927 A1 | 9/2005 | Aaltonen et al. | |
| 2005/0234860 A1 | 10/2005 | Roever et al. | |
| 2005/0246193 A1 | 11/2005 | Roever et al. | |
| 2006/0002406 A1 | 1/2006 | Ishihara et al. | |
| 2006/0059253 A1 * | 3/2006 | Goodman et al. | 709/223 |
| 2006/0140162 A1 | 6/2006 | Vasa | |
| 2006/0195565 A1 * | 8/2006 | De-Poorter | 709/224 |
| 2007/0058568 A1 | 3/2007 | Previdi et al. | |
| 2007/0061891 A1 * | 3/2007 | Suzuki et al. | 726/27 |
| 2007/0127372 A1 | 6/2007 | Khan et al. | |
| 2007/0130046 A1 | 6/2007 | Khan et al. | |
| 2007/0133553 A1 | 6/2007 | Kahn et al. | |
| 2007/0133570 A1 | 6/2007 | Khan et al. | |
| 2007/0133571 A1 | 6/2007 | Kahn et al. | |

(56) References Cited

U.S. PATENT DOCUMENTS

| | | | |
|---|---|---|---|
| 2007/0133710 | A1 | 6/2007 | Khan et al. |
| 2007/0136209 | A1 | 6/2007 | Khan et al. |
| 2007/0192872 | A1* | 8/2007 | Rhoads et al. ............ 726/26 |
| 2007/0291773 | A1 | 12/2007 | Khan et al. |

FOREIGN PATENT DOCUMENTS

| | | |
|---|---|---|
| EP | 1187505 | 3/2002 |
| EP | 1513301 | 9/2005 |
| GB | 2399257 | 9/2004 |
| GB | 2411549 | 8/2005 |
| JP | 2000-500308 | 1/2000 |
| JP | 2000-059377 | 2/2000 |
| JP | 2001-077856 | 3/2001 |
| JP | 2002-261800 | 9/2002 |
| JP | 2002-261805 | 9/2002 |
| JP | 2003-209568 | 7/2003 |
| JP | 2004-140486 | 5/2004 |
| JP | 2004-159296 | 6/2004 |
| JP | 2004-341929 | 12/2004 |
| JP | 2005-150955 | 6/2005 |
| KR | 2000-4564 | 1/2000 |
| KR | 2001-16690 | 3/2001 |
| KR | 2005-17108 | 2/2005 |
| WO | 9618939 | 6/1996 |
| WO | 00/10357 | 2/2000 |
| WO | 00/45560 | 8/2000 |
| WO | 2004/006486 | 1/2004 |
| WO | 2005-004518 | 1/2005 |
| WO | 2007/067911 | 6/2007 |
| WO | 2007/067913 | 6/2007 |
| WO | 2007/067915 | 6/2007 |
| WO | 2007/067917 | 6/2007 |
| WO | 2007/067930 | 6/2007 |
| WO | 2007/067933 | 6/2007 |
| WO | 2007/067934 | 6/2007 |
| WO | 2008/078149 | 7/2008 |

OTHER PUBLICATIONS

High Energy, by Tom Kaneshige, published on www.Line56.com on Oct. 17, 2001.
Multiprotocol Label Switching Architecture Memo, Copyright © The Internet Society (2001).
Search Report—Written Opinion issued Aug. 28, 2008 for PCT/US07/61697, 7 pages.
International Preliminary Report on Patentability issued Sep. 3, 2008 for PCT/US07/61697, 5 pages.
Search Report—Written Opinion issued Oct. 11, 2007 for PCT/US06/61701, 9 pages.
International Preliminary Report on Patentability issued Jun. 11, 2008 for PCT/US06/61701, 5 pages.
Search Report—Written Opinion issued Oct. 16, 2007 for PCT/US06/61702, 9 pages.
International Preliminary Report on Patentability issued Jun. 11, 2008 for PCT/US06/61702, 7 pages.
Search Report—Written Opinion issued Oct. 16, 2007 for PCT/US06/61650, 9 pages.
International Preliminary Report on Patentability issued Jun. 11, 2008 for PCT/US06/61650, 7 pages.
International Preliminary Report on Patentability issued Jul. 8, 2008 for PCT/US06/61653, 6 pages.
Search Report—Written Opinion issued on Nov. 15, 2007 for PCT/US06/61657, 7 pages.
International Preliminary Report on Patentability issued Jun. 11, 2008 for PCT/US06/61657, 5 pages.
Search Report—Written Opinion issued on Jul. 7, 2008 for PCT/IB06/004281, 9 pages.
International Preliminary Report on Patentability issued Jul. 29, 2008 for PCT/IB06/004281, 7 pages.
Search Report—Written Opinion issued on Aug. 8, 2008 PCT/US06/61660, 7 pages.
International Preliminary Report on Patentability issued Oct. 28, 2008 for PCT/US06/61660, 4 pages.
Office Action for U.S. Appl. No. 11/296,819 mailed Dec. 11, 2008, 10 pages.
Office Action for U.S. Appl. No. 11/296,011 mailed Jun. 20, 2008, 12 pages.
Response to Office Action of Jun. 20, 2008 for U.S. Appl. No. 11/296,011 mailed Sep. 22, 2008, 13 pages.
Office Action for U.S. Appl. No. 11/296,011 mailed Dec. 16, 2008, 12 pages.
Office Action for U.S. Appl. No. 11/295,769 mailed Oct. 3, 2008, 9 pages.
Response to Office Action of Oct. 3, 2008 for U.S. Appl. No. 11/295,769 mailed Jan. 5, 2009, 20 pages.
Office Action for U.S. Appl. No. 11/295,769 mailed Jan. 22, 2009, 12 pages.
International search report and written opinion for application No. PCT/US2006/61653, mailed Mar. 20, 2008.
International Search Report for Application No. PCT/US06/61659 dated Jul. 7, 2008, 3 pages.
Search Report and Written Opinion for Application No. PCT/US06/61659 dated Jul. 7, 2008, 7 pages.
Supplemental European Search Report and opinion for European Application No. 06846487 mailed Dec. 1, 2009, 7 pages.
Supplemental European Search Report and opinion for Application No. PCT/US2006/061653 mailed Apr. 14, 2010, 10 pages.
Official Action in Korean Application No. 10-2008-7016254 dated Mar. 26, 2010, 4 pages, and Unofficial Summary of Official Action (translated in English), 1 page.
International Search Report and Written Opinion for Application No. PCT/US2006/061653 dated Mar. 20, 2008, 9 pages.
International Preliminary Report for Application No. PCT/US2006/061653 dated Jul. 17, 2008, 6 pages.
Supplemental European Search Report for Application No. PCT/US2006/061653 dated Apr. 14, 2010, 10 pages.
Official Action in Chinese Application No. 200680052073.9 issued Aug. 21, 2009, 42 pages. English Translation Available.
Official Action in Chinese Application No. 200680052073.9 issued Mar. 9, 2010, 5 pages. English Translation Available.
RFC 3031, 2001; IETF Networking Group, by E. Rosen et al.
Knightson,et al., NGN Architecture: Generic Principles, Functional Architecture, and Implementation; Oct. 8, 2005; pp. 49-56.
Official Action in Japanese Application No. 2008-544636 issued Oct. 12, 2010, 3 pages. English Summary Available.

* cited by examiner

DIGITAL OBJECT ROUTING BASED ON A SERVICE REQUEST

BACKGROUND

The subject matter disclosed herein relates to transmitting digital objects in a network. Information exchange networks such as the Internet couple multiple host computing platforms wherein data may be exchanged between two or more computing platforms. For example, a source node coupled to such a network may send a digital object from the source node to a destination node located somewhere on the network. Where the network includes the Internet, for example, the source node may connect to the Internet via a first Internet Service Provider (ISP), and the remote node may likewise connect to the Internet via a second Internet Service Provider. Multiple intermediary nodes may be coupled to the Internet that may receive the digital object and forward it on to another intermediary node until the digital object reaches the destination node. Such forwarding of a digital object may occur using an Internet Protocol (IP) which specifies a format in which the digital object may be transferred as packet data, and the addressing scheme to route the digital object in the form of data packets through the Internet to the source node. Furthermore, a network such as the Internet may additionally utilize a Transmission Control Protocol (TCP) to establish a connection between a source node and a destination node. Using such a TCP/IP protocol, data packets are routed automatically by intermediary nodes to a destination IP address without regard to the available services a given node may provide and/or without regard to compensation based on the services provides.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, may best be understood by reference to the following detailed description when read with the accompanying drawings in which:

Figure 1:
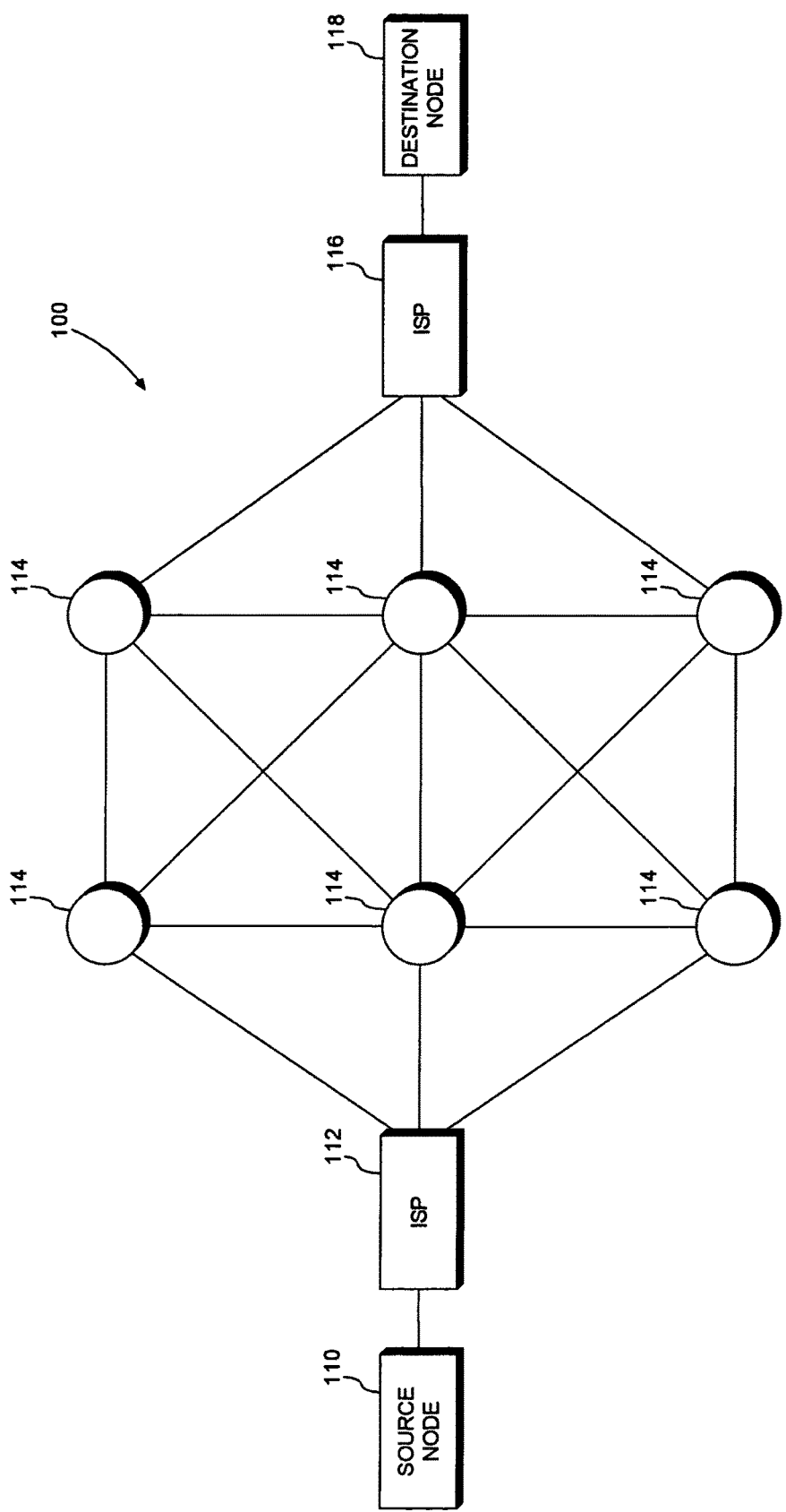
FIG. 1 is a block diagram of a network to route a digital object on accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of algorithms, programs and/or symbolic representations of operations on data bits or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computer and/or computing system, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include apparatuses for performing the operations herein. This apparatus may be specially constructed for the desired purposes, or it may comprise a general purpose computing device selectively activated and/or configured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. A variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term and/or may mean and, it may mean or, it may mean exclusive-or, it may mean one, it may mean some but not all, it may mean neither, and/or it may mean both, although the scope of the claimed subject matter is not limited in this respect.

Certain embodiments may be used in a variety of applications. Although the claimed subject matter is not limited in this respect, the circuits disclosed herein may be used in many apparatuses such as in the transmitters and/or receivers of a radio system. Radio systems intended to be included within the scope of the claimed subject matter may include, by way of example only, wireless personal area networks (WPAN) such as a network in compliance with the WiMedia Alliance, a wireless local area networks (WLAN) devices and/or wireless wide area network (WWAN) devices including wireless network interface devices and/or network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and/or the like, although the scope of the claimed subject matter is not limited in this respect.

Types of wireless communication systems intended to be within the scope of the claimed subject matter may include, although are not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wideband CDMA (WCDMA), CDMA-2000, and/or the like, although the scope of the claimed subject matter is not limited in this respect.

Reference throughout this specification to one embodiment or an embodiment means that a particular feature, structure, or characteristic described in connection with the embodiment is included in at least one embodiment. Thus, the appearances of the phrase in one embodiment or an embodiment in various places throughout this specification are not necessarily all referring to the same embodiment. Furthermore, the particular features, structures, or characteristics may be combined in one or more embodiments.

A network as referred to herein relates to infrastructure that is capable of transmitting data among nodes which are coupled to the network. For example, a network may comprise links capable of transmitting data between nodes according to one or more data transmission protocols. Such links may comprise one or more types of transmission media and/or links capable of transmitting information from a source to a destination. However, these are merely examples of a network, and the scope of the claimed subject matter is not limited in this respect.

In the transmission of data in a data transmission network, a source node may initiate transmission of data to one or more destination nodes coupled to the data transmission network. In one particular embodiment, although the scope of the claimed subject matter is not limited in this respect, a source node may initiate the transmission of data to the destination node based, at least in part, upon a destination address associated with the destination node. According to a communication protocol of a particular embodiment, the source node may transmit data to the destination node in one or more data packets which are routed to the destination node through the data transmission network based, at least in part, on the destination address. However, these are merely examples of how data may be transmitted from a source node to a destination node in a network, and the scope of the claimed subject matter is not limited in these respects.

A node in a network may forward information to one or more other nodes in the data transmission network over data links. In one particular example, a first node may forward information to a second node by transmitting one or more data packets according to a communication protocol. Such data packets may comprise a header portion containing an address of an intended destination node and a payload containing forwarded information. If the second node is not the ultimate intended destination, the second node may also forward the data packets to a third node which comprises and/or is coupled to the ultimate intended destination node. However, these merely examples of how information may be forwarded in a network, and the scope of the claimed subject matter is not limited in this respect.

A digital object as referred to herein relates to information that is organized and/or formatted in a digitized form. For example, a digital object may comprise one or more documents, visual media and/or audio media, and/or combinations thereof. However, these are merely examples of the types of information that may be maintained in a digital object, and the scope of the claimed subject matter is not limited in this respect. Such a digital object may be maintained in a compressed format to enable efficient storage of the digital object in a storage medium and/or transmission of the digital in a data transmission network. In other embodiments, such a digital object may be encrypted for transmission in a secure communication channel. In one particular embodiment, although the scope of the claimed subject matter is not limited in this respect, a digital object may be compressed and/or formatted at a source node for transmission to one or more destination nodes. Also, a digital object may be transmitted to one or more destination nodes as one or more data packets routed to the one or more data nodes according to a communication protocol. However, these are merely examples of a digital object, and the scope of the claimed subject matter is not limited in this respect. In one or more embodiments, a digital object may comprise a digital data payload as described in U.S. Pat. No. 6,199,054.

A bid as referred to herein relates to an expression of a proposal to perform a service. In one particular example, a customer and/or client may receive bids from more than one party competing for the business of the customer and/or client. A bid may specify terms under which a service may be performed such as, for example, price, quality, timeliness and/or reliability. However, these are merely examples of terms that may be expressed in a bid, and the scope of the claimed subject matter is not limited in this respect. Also, in some commercial contexts, acceptance of a bid by a customer and/or client may be binding on the parties. In other commercial contexts, however, acceptance of a bid by a customer and/or client, in and of itself, may not be binding. Here, additional actions by one or more parties may result in a binding arrangement. It should be understood that these are merely examples of a bid, and the scope of the claimed subject matter is not limited in this respect.

A bid request as referred to herein relates to an expression of an invitation to provide a bid for performing a service. In one particular example, such a bid request may specify a desired service to be performed by a service provider. In some embodiments, the bid request may specify some of the terms, but not necessarily all of the terms, under which a desired service is to be performed. However, these are merely examples of a bid request, and the scope of the claimed subject matter is not limited in this respect.

In response to receipt of a bid from a service provider for providing a service, a potential customer and/or client may provide an acceptance message to the bidding service provider. Such an acceptance message may express a willingness of the customer and/or client to receive services from the service provider according to at least some terms set forth in the received bid. However, this is merely an example of an acceptance message, and the scope of the claimed subject matter is not limited in this respect.

In forwarding a digital object from a source node to a destination node over a network, equipment which is owned, leased, controlled and/or operated by one or more intermediaries or intermediary parties may forward at least a portion of the digital object over at least a portion of the network toward the destination node. As illustrated below, the term intermediary may refer to a party that may forward a digital object over at least a portion of the data transmission network and/or equipment that is owned, leased, controlled and/or operated by the party for performing this service.

Equipment that is owned, leased, controlled and/or maintained by an intermediary may comprise equipment that is capable of transmitting information to and/or receiving information from a data transmission network. Here, such equipment may comprise one or more communication ports capable of receiving information from a source node and/or transmitting information to a destination node over one or more data transmission mediums forming links in the network. Such a communication port may be capable of transmitting and/or receiving information from any one of several types of media such as, for example, cabling which may include optical, coaxial, unshielded twisted wire pair cabling, and so on, and/or wireless transmission media which may include terrestrial wireless transmission links or non-terrestrial vehicle links such as atmospheric vehicles, aquatic vehicle, and/or space vehicles. However, these are merely examples of a communication port that may couple equipment which is owned, leased controlled and/or operated by an intermediary to a data transmission network, and the scope of the claimed subject matter is not limited in this respect.

Instructions as referred to herein relate to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. However, these are merely examples of an instruction, and the scope of the claimed subject matter is not limited in this respect.

A storage medium as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium, and the scope of the claimed subject matter is not limited in this respect.

Logic as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA), for example. Also, logic may comprise machine-readable instructions stored in a storage medium in combination with processing circuitry to execute such machine-readable instructions. However, these are merely examples of structures which may provide logic, and the scope of the claimed subject matter is not limited in this respect.

An agent as referred to herein relates to a process that executes on a first device and is capable of communicating with a second device over a network. In one particular embodiment, for example, an agent process may collect information associated with the first device and enable transmission of the collected information to the second device. In another embodiment, an agent may receive control signals from the second device to enable remote control of at least one aspect of the first device. However, these are merely examples of how an agent may enable communication between devices, and the scope of the claimed subject matter is not limited in this respect. In another embodiment, an agent may execute on a processor under the control of machine-readable instructions stored on a storage medium. In another embodiment, an agent may be executed on different types of structure that provide logic. However, these are merely examples of an agent, and the scope of the claimed subject matter is not limited in this respect.

A Quality of Service (QoS) as referred to herein relates to a characteristic of a data transmission service to provide data to a recipient within time constraints. A quality of service may refer to a characteristic of a transmission control protocol/internet protocol (TCP/IP) type protocol, and/or a user datagram protocol/internet protocol (UDP/IP) type protocol. In one or more embodiments, a quality of service may refer to a threshold error transmission rate, for example where one or more data packets may not arrive, and/or where one or more data packets that do arrive may include one or more corrupted bits of information. In one or more embodiments, a quality of service may refer to where no errors and/or no error rate is acceptable, and/or to a threshold where the number of errors and/or the error rate may not exceed a predetermined value, and/or to a range within which a number of errors and/or an error rate may be acceptable, although the scope of claimed subject matter is not limited in this respect. In a particular embodiment, for example, a QoS may be associated with the transmission of a digital object from a source node to a destination node. Here, for example, a QoS may specify that all or a portion of the digital object arrive at the destination node within some time constraint. In another embodiment, a QoS may define, at least in part, an effective data rate at which a digital object is to be transmitted to the destination node. However, this is merely an example of how QoS may be applied in the transmission of a digital object, and the scope of the claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, process described herein, with reference to flow diagrams or otherwise, may also be executed and/or controlled, in whole or in part, by such a computing platform.

Referring now to FIG. 1, block diagram of a network in accordance with one or more embodiments will be discussed. A source node 110 may couple to an internet service provider (ISP) 112 that may provide source node 110 with access to network 100. In one embodiment, network 100 may include one or more nodes 114 on network 100 where a first node 114 may communicate with one or more other nodes 114 on network 100. In one embodiment, network 100 may comprise the Internet, although the scope of the claimed subject matter is not limited in this respect. Internet service provider 112 may provide source node 110 with access to network 100 via one or more data transmission access technologies, for example, public switched telephone network (PSTN), digital subscriber line (DSL), coaxial cable or wireless access, for example, using satellite and/or terrestrial links. However, these are merely examples of how a node such as source node 110 may obtain access to network 100, and the scope of the claimed subject matter is not limited in this respect. Network 100 may be capable of transmitting data packets among nodes 114 in a network topology according to an Internet Protocol (IP). However, this is merely an example of a communication protocol that may be used in the transmission of all or portions of a digital object from source node 110 to destination node 118, and the scope of the claimed subject matter is not limited in this respect. In the particular embodiment illustrated in FIG. 1, source node 110 and destination node 118 may access network 100 through the facilities of Internet service providers (ISPs) 110 and/or 116. For example, source node 110 and/or destination node 118 may comprise subscribers of corresponding ISPs that may enable access to network 100 for a subscription fee. However, ISPs 110 and/or 116 are merely examples of how source node 110 and/or destination node 118 may access network 100, and the scope of the claimed subject matter is not limited in this respect. It should be noted that there may be one or more source nodes 110 and one or more destination nodes 118 able to couple to network 100 via one or more of ISP 112 and/or one or more of ISP 116. Likewise, the number of nodes 114 in network 100 may be zero, and/or one or more, and nodes 114 may be capable of communicating with one or more other of nodes 114, although the scope of the claimed subject matter is not limited in this respect. Nodes 114 may be referred to in general as intermediaries referring to intermediate locations, devices, and/or paths between source node 110 and destination node 118, although the scope of the claimed subject matter is not limited in this respect. According to an embodiment, nodes 114 and/or ISP 112 and/or 116 may comprise one or more routers to forward data packets originating at source node 110 to destination node 118, although the scope of the claimed subject matter is not limited in this respect.

According to an embodiment, source node 110 and/or destination node 118, and/or optionally one or more of nodes 114, may comprise any one of several types of devices that are capable of transmitting and/or receiving digital objects. In one particular example, source node 110 and/or destination node 118 may include a communication port (not shown) arranged to transmit data to and/or receive data from one or more of ISP 110 and/or 118 through a data transmission medium using one or more of the herein mentioned access technologies. In addition to communication ports, source node 110 and/or destination node 118, and/or optionally one or more of nodes 114, may also comprise a computing platform employing a processor, one or more memory devices and appropriate input/output devices for communicating between processes executing on the processor and communication ports. Such processes executable on a computing platform may be controlled, at least in part, by machine-readable instructions stored in one or more memory devices of the computing platform. In one particular embodiment, a computing platform system at source node 110 may execute one or more processes to create and/or format a digital object for transmission on network 100. However, this is merely an example of how a source node 110 may create and/or format a digital object for transmission on network 100, and the scope of the claimed subject matter is not limited in this respect. In another particular embodiment, a computing platform at destination node 118 may execute one or more processes to utilize a digital object received via network 100 through a communication port. However, this is merely an example of how destination node 118 may process a digital object received from network 100, and the scope of the claimed subject matter is not limited in this respect.

According to an embodiment, equipment that is owned, leased, controlled and/or operated by owners and/or operators of nodes 114 may transmit digital objects between ISP 112 and ISP 116. Links coupling nodes 114 to ISP 110 and ISP 116 may comprise any one of several data transmission mediums such as, for example, cabling such as fiber optic, coaxial and/or unshielded twisted wire pair cabling, and/or wireless transmission media, for example, using terrestrial and/or satellite based links. However, these are merely examples of transmission media that may be utilized to transmit digital objects in network 100, and the scope of the claimed subject matter is not limited in this respect.

As illustrated in FIG. 1, ISP 110 may transmit a digital object to ISP 116 in any one of multiple paths comprising at least one or more corresponding nodes 114. According to a particular embodiment, ISP 110 may transmit a digital object to ISP 116 through any one of nodes 114 via any one or more of transmission links that may couple nodes 114. According to a particular embodiment, source node 110 and/or ISP 1112 may select a particular one or more of nodes 114 to forward the digital object to ISP 116. However, this is merely an example of how a particular node 114 may be selected for forwarding a digital object from source node 110 to destination node 118, and the scope of the claimed subject matter is not limited in this respect.

According to an embodiment, although the scope of the claimed subject matter is not limited in this respect, nodes 114 may route digital objects between ISP 112 and ISP 116 in one or more data packets formatted according to a particular network protocol such as the Internet Protocol (IP). Such data packets may be forwarded on data links connecting nodes 114 and ISP 112 and ISP 116 according to any one of several data link layer protocols such as, for example, Ethernet, Asynchronous Transfer Mode (ATM), Frame Relay and/or Synchronous Optical NETwork/Sychronous Digital Hierarchy (SONET/SDH) data link protocols. In embodiments employing wireless communication links, data packets may be forwarded on such wireless communication links according to any one of several wireless data link protocols such as, for example, IEEE Standards 802.11, 802.16 and/or the like, and/or wireless data link protocol including, for example, but not limited to, Code Division Multiple access (CDMA), Single Carrier Radio Transmission Technology (1×RTT), Enhanced Data for Global Evolution (EDGE), Evolution Data Only (EV-DO), Fast Low-latency Access with Seamless Handoff Orthogonal Frequency Division Multiplexing (Flash-OFDM), General Packet Radio Service (GPRS), Global System for Mobile Communications (GSM), and/or Universal Mobile Telecommunications System (UMTS), and/or the like. However, these are merely examples of data link protocols that may be used to transmit and/or receive data packets in network 100, and the scope of the claimed subject matter is not limited in this respect.

Figure 2:
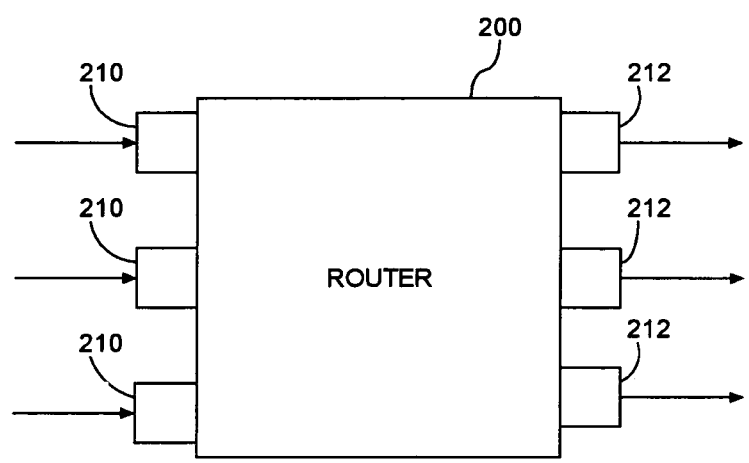
FIG. 2 is a block diagram of a router in accordance with one or more embodiments.

Referring now to FIG. 2, a block diagram of a router in accordance with one or more embodiments will be discussed. The router 200 shown in FIG. 2 may be owned, leased and/or operated at a node 114 and/or ISP 112 and/or ISP 118 to transmit at least a portion of a digital object to destination node 118 according to an embodiment. Router 200 may include one or more input ports 210 to receive data packet communications according to one or more protocols mentioned herein. One or more of input ports 210 may be capable of receiving all or at least a portion of a digital object from ISP 112 originating from source node 110. Router 200 may also include one or more output ports 212 to transmit data packet communications according to one or more of the protocols mentioned herein. One or more of output ports 212 may be capable of transmitting all or a portion of a digital object to ISP 116, and the packet may then be forwarded to one or more destination nodes 118.

According to an embodiment, router 200 may comprise logic to determine how to forward packets received on input ports 210 to output ports 212. For example, router 200 may determine an output port 212 for forwarding a received data packet based, at least in part, on information associated with the received data packet such as, for example, a destination address. According to a particular embodiment, router 200 may determine an output port 212 for forwarding the received data packet according to one or more look up tables associating destination Internet Protocol (IP) address with output ports 212. However, this is merely an example of how a router may determine an output port for forwarding a data packet, and the scope of the claimed subject matter is not limited in this respect. Notwithstanding the existence of a valid destination address associated with a received data packet, according to an embodiment, router 200 may also select whether or not to forward a received data packet based, at least in part, on information such as the destination and/or source associated with the data packet, or other information associated with the data packet.

According to an embodiment, the aforementioned logic of router 200 to control routing data packets from an input port 210 to an output port 212 may comprise one or more computer systems comprising one or more processors and memory devices. The memory devices may comprise machine-readable instructions to execute on the one or more processors for controlling the routing of data packets. Alternatively, router 200 may comprise one or more Application-Specific Integrated Circuit (ASIC) devices to control routing, and/or combinations of one or more ASIC devices and one or more computer systems to control routing. However, these are merely examples of logic that may be employed in a router for controlling the forwarding of data packets and claimed subject matter is not limited in these respects. In one or more embodiments, router 200 may comprise and/or be implemented by one or more computing platforms as described herein, for example as a network interface card and/or a server adapted to operate at least in part as a router and/or to provide one or more routing functions, although the scope of the claimed subject matter is not limited in this respect.

According to an embodiment, one or more of nodes 114 and one or more of ISP 112 and/or ISP 116, for example as shown in FIG. 1, may employ one and/or more than one router 200 to forward a digital object to a destination node 118. A digital object received from source node 110 at a first router may be forwarded to a second router where both first and second routers are owned, leased, controlled and/or operated by nodes 114 and/or ISP 112 and/or ISP 116. In such an embodiment, the first router may receive the digital object from ISP 112 and forward the received digital object to the second router either directly to the second router or via one or more other routing devices. The second router may then forward to ISP 116 the digital object received from the first router. However, this is merely an example of how a node as an intermediary may employ multiple routers for forwarding a digital object from a source node to a destination node, and claimed subject matter is not limited in this respect.

According to an embodiment, one or more of nodes 114 and/or ISP 112 and/or ISP 116 may employ Multiprotocol Label Switching (MPLS) according to the MPLS Architecture set forth, for example, in Internet Engineering Task Force (IETF), Network Working Group, RFC 3031, 2001. In such an embodiment, ISP 112 may comprise a label edge router (LER) that is capable of assigning label values to packets received from source node 110 for transmission to destination node 118. One or more routers 200 of nodes 114 may comprise a Label Switch Router (LSR) to make forwarding decisions for received data packets based, at least in part, upon label values assigned to the received data packets. At a network hop between ISP 112 and ISP 116, an LSR associated with one or more of nodes 114 may remove an existing label of a received data packet and apply a new label indicating how the next, downstream LSR is to forward the data packet to a destination. Label switch routers coupled to forward a digital object from ISP 112 to ISP 116 may then form a Label Switch Path (LSP) determined, at least in part, according to labels, selected from a hierarchy of labels known as a label stack, assigned to data packets transporting the digital object at network hops between ISP 112 and ISP 116. However, this is merely an example of how a digital object may be transmitted between nodes on a data transmission network using MPLS, and the scope of the claimed subject matter is not limited in this respect.

In one or more embodiments, router 200 may implement routing of packets and/or data using existing processes, routing tables, and/or MPLS to shape the flow of traffic, optionally without consideration for the object-based QoS requirements and/or other criteria as it pertains to the transmission of a particular digital object and/or a series of objects. In one or more embodiments, router 200 may implement routing of packets and/or data using existing processes, routing tables, and/or MPLS to shape the flow of traffic, optionally including consideration for the object-based QoS requirements and/or other criteria as it pertains to the transmission of a particular digital object and/or a series of objects. In one or more embodiments, router 200 may be programmed with software and/or firmware to implement routing of packets and/or data, and in one or more alternative embodiments, router 200 may be wired and/or utilize switches to implement routing of packets and/or data at a predetermined QoS based at least in part on packet traffic, although the scope of claimed subject matter is not limited in this respect. In one or more embodiments, instructions by which router 200 may be arranged to route and/or forward packets may be received from a source external to router 200, and in one or more embodiments, router 200 may be arranged to forward predetermined packets and/or digital object in a predetermined setting, for example where one of input ports 210 may be coupled to one or more output ports 212, which may be arranged, for example, to last for a predetermined period of time, although the scope of claimed subject matter is not limited in this respect.

Figure 3:
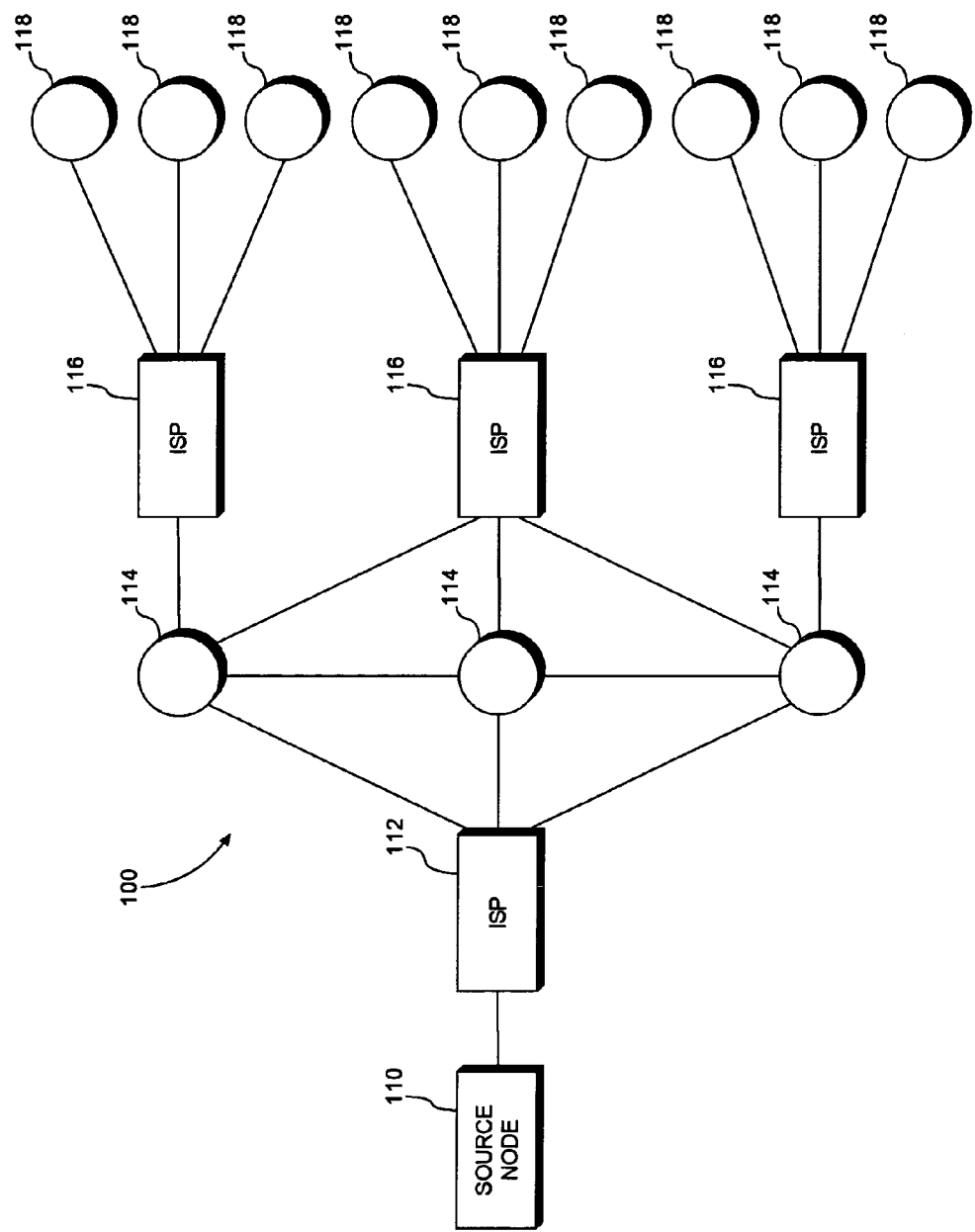
FIG. 3 is a block diagram of network that may be utilized to transmit a digital object to two or more nodes and/or destination nodes in accordance with one or more embodiments.

Referring now to FIG. 3, a block diagram of network that may be utilized to transmit a digital object to two or more nodes and/or destination nodes in accordance with one or more embodiments will be discussed. As shown in FIG. 3, source node 110 may transmit a digital object to more than one destination node 118 coupled to one or more ISPs 116. Likewise, although not shown, destination node and/or nodes 118 may receive a digital object from more than one source node and/or nodes 110. One or more intermediary nodes 114 may be employed to forward the digital object to two or more destination nodes 118. In one or more alternative embodiments, source node 112 may transmit a digital object in two or more sets of data packets using multiple intermediaries, for example where there may be more than one destination node and/or where a single larger sized object may be split into multiple sub-objects to be transmitted on a separate path and/or paths using a separate criterion and/or criteria, for example QoS, costs, and so on, although the scope of claimed subject matter is not limited in this respect. According to an embodiment, a digital object formatted for transmission to one or more of destination nodes 118 may be copied at either ISP 112 or one or more of nodes 114 and/or one or more of ISP 116 for transmission to multiple destination nodes 118. An intermediary one or more of nodes 114 may comprise one or more routers, such as router 200, for example, to forward data packets to one or more of destination nodes 118. Furthermore, network 100 may employ MPLS and select particular one or more intermediary nodes 114 for forwarding the digital object to one or more destination nodes 118.

In the embodiment shown in FIG. 3, a single intermediary node 114 may be capable of forwarding a digital object from ISP 112 to one or more destination nodes 118 coupled to any of ISPs 116. Likewise, an intermediary node 114 may forward the digital object to multiple destination nodes 118 coupled to all of ISPs 116 by selecting another intermediary node 114 through which the digital object may be routed to selected ISPs 116 and then on to selected destination nodes 118, although the scope of the claimed subject matter is not limited in this respect.

In one or more embodiments, network 100 as shown in FIG. 1 and/or FIG. 3 may determine a route for transmitting a digital object between a router 200 at ISP 112 and a router at ISP 116, a route for transmitting a digital object between a router 200 at one intermediary node 114 and a router 200 at another intermediary node 114, and/or a route for transmitting a digital object between a router at an intermediary node 114 and ISP 112 and/or ISP 116. When source node 110 is prepared to send a digital object to destination node 118, source node 110 may transmit the digital object to ISP 112 where the digital object may include information relating to the digital object to be sent. Such information relating to the digital object to be sent may be referred to as digital object information. Such digital object information may include, for example, the size of the digital object, for example in megabytes, the priority of the digital object with respect to a priority of one or more other digital objects, the time frame in which it may be desired to transmit the digital object, the link quality that may be desired between source node 110 and destination node 118, a quality of service (QoS) that may be desired between source node 112 and destination node 118, a latency parameter that may be desired between source node 112 and destination node 118, the type of information that the digital object comprises, for example text data, e-mail data, HTML data, media data, the format of the data file, and so on. In one or more embodiments, digital object information may comprise a digital transmission form (DTF). Such digital transmission form (DTF), for example, may comprise predefined fields that specify terms of a service request for the service of transmitting a digital object to a destination node. Such predefined fields may be used for providing information to a requesting party such as, for example, size of the digital object to be transmitted, for example in bits, bytes, cells, packets, and/or the like, destination address and/or addresses, QoS, compression format, security/encryption, billing account number, and so on. However, these are merely examples of predefined fields that may be used in a DTF for providing a service request, and the scope of claimed subject matter is not limited in these respects. In one or more embodiments, digital object information may be incorporated, wholly or at least in part, with the digital object. For example, digital object information may comprise a header and/or be contained within a header of the digital object. In one or more alternative embodiments, digital object information may be an object that is separate, wholly or at least in part, from the digital object itself. For example, digital object information may be a separate routing bill and/or stub that contains destination information pertaining to the digital object, sender information, receiving information, quality of service information, routing path information, and so on. In such embodiments, the digital object information may be routed along with the digital object, or alternatively may be routed independently from the digital object, at least in part, and/or may follow a different transmission path along network 100. In one or more embodiments, digital object information may indicate to one or more downstream nodes, such as nodes 114, what is coming and/or contained in the digital object, and/or the requested quality of service, and/or a request for information from the downstream nodes whether the downstream nodes can handle the digital object, store the digital object, forward the digital object, and so on. In one or more embodiments, the digital object information may reach the same destination as the digital object, and in one or more alternative embodiments the digital object information may not actually reach and/or may not be required to reach the same destination as the digital object. However, these are merely examples of how digital object information may be embodied, and the scope of the claimed subject matter is not limited in these respects.

In one or more embodiments, a digital object (DO) may refer to the payload to be transmitted on network 100, for example a movie file, and a digital transmission file (DTF) may refer to information regarding the digital object, which may be referred to as digital object information. For example, a digital transmission form may be another object, typically smaller, but not necessarily smaller, than the digital object, and may be an object independent from the digital object itself, that represents the digital object and/or information regarding the digital object. In one embodiment, the digital transmission form may comprise metadata about the digital object, for example size, bid, charges, QoS, routing information, and/or the like. The digital transmission form may traverse the same path in network 100 as the digital object, and/or the digital transmission form may traverse a path that is different at least in part from the digital object. In one or more embodiments, a digital transmission form may not be required and/or utilized, for example where preexisting agreements and/or prearranged routs may exist to handle the forwarding of the digital object. In other embodiments, a digital transmission form may be utilized as an instrument in which bids and/or costs for forwarding the digital object on network 100 may be utilized and/or negotiated prior to the transmission of the digital object on network 100. In any given network in certain embodiments, a digital object may include a corresponding digital transmission form, and in other embodiments, a digital object may not have a corresponding digital transmission form. However, these are merely examples of how a digital transmission form may be utilized to transmit a digital object via network 100, and the scope of claimed subject matter is not limited in these respects.

In one or more embodiments, the digital object may include information pertaining to a request of a level of service for the delivery of the digital object to one or more destination nodes 118. For example, the digital object information may include one or more of a size of the object to be transmitted, a description of the contents and/or the payload of the digital object, a requested timeliness of transmittal and/or a time frame in which the digital object is requested to be transmitted, a quality of service (QoS) with which the object is requested to be transmitted, an amount of money that the sender is willing to pay for transmission of the digital object, payment information such as credit card information, bank account information, bartering and/or trade information, and or other financial payment information such as PayPal® account information and/or Western Union® payment information, and/or a level of priority with which the digital object is to be transmitted, although the scope of the claimed subject matter is not limited in this respect.

A router 200 at ISP 112 may, for example, examine the digital object information to determine how and/or when the digital object should be transmitted to one or more destination nodes 118. In one or more embodiments, source node 110 may provide directly to ISP 112 payment for requested services for the transmission of the digital object, and then ISP 116 may contract for and/or pay for and/or arrange for the transmission of the digital object with one more intermediary nodes 114. In such an embodiment, source node 110 may be a customer of ISP 112 who in turn makes arrangements for providing services to source node 110. In an alternative embodiment, ISP 112 may forward the digital object information to one or more intermediary nodes 114, which may review the requested service and/or services in the digital object information to determine whether such intermediary nodes 114 have the capability to provide the requested services, and/or whether such intermediary nodes 114 have a willingness to provide the requested services. Such capability and/or willingness may be based, at least in part, on traffic loading at a given intermediary node 114, available bandwidth at a given intermediary node 114, available quality of service at a given intermediary node 114, an amount of money that source node 114 is willing to pay for requested services, a time frame in which a given intermediary node 114 is capable of receiving and/or forwarding the digital object, an amount of storage capacity available at a given intermediary node 114, for example where intermediary node 114 may be requested to store the digital object for a predetermined period, and/or whether a given intermediary node 114 is capable of receiving the form of payment indicated in the digital object information, for example whether a payment by a given credit card is accepted, and/or the like. One or more of intermediary nodes 114 may then provide one or more responses back to ISP 112, which in turn forwards the responses to source node 110. Source node 110 may then decide which node or nodes 114 have provided a satisfactory response, and then source node 110 may indicate to ISP 112 which node and/or nodes 114 that source node 110 would like to use to route the digital object to one or more destination nodes. ISP 112 may then arrange a routing table according to such indication by source node 110, and then forward the digital object according to the routing table. ISP 112 may charge a fee to source node 110 for making such arrangements, and/or intermediary nodes 114 may also charge a fee, either to ISP 112 as an intermediary and/or to source node 110, for example by charging the fee to one or more of the financial accounts listed in the digital object information. In such an arrangement, ISP 112 may function as a broker for source node 110. In yet another embodiment, ISP 112 may merely forward the digital object information on to one or more of intermediary nodes 114, and then source node 110 may directly make arrangements for transmitting the digital object with one or more intermediary nodes 114, which may be with minimal and/or no intervention by ISP 112 other than, for example, forwarding information and/or digital objects. In such an embodiment, ISP 112 may provide such services to source node 110 as part of an overall Internet Service Provider agreement between source node 110 and ISP 112. However, these are merely some examples of arrangements between source node 110, ISP 112, and/or intermediary nodes 114, and the scope of the invention is not limited in this respect.

In one or more embodiments, ISP 112 may examine the traffic loads between ISP 112 and one or more intermediary nodes 114, which may include, for example, intermediary nodes 114 that are coupled to or proximately coupled to one or more output ports 212 of router 200. In one embodiment, for example, when a router 200 at ISP 112 transmits data packets to routers 200 at nodes 114, routers 200 may transmit information regarding the link between ISP 112 and node 114, for example the transmission time, latency time, channel information, link quality, error rate, retransmission rate, and/or the load on router 200 nodes 114. In general, such information may be referred to as link information. When router 200 of ISP 112 receives such link information from routers 200 downstream nodes 114, router 200 of ISP 112 may determine which of nodes 114 are suitable for transmission of the digital object based from ISP 112 to nodes 114 on at least in part on the link information and the digital object information. For example, if the digital objection information specifies a minimum Quality of Service, ISP 112 may determine which links between ISP 112 and nodes 114 will satisfy this minimum Quality of Service based on the link information received from nodes 114, and will transmit the digital object to intermediary nodes 114 where the links between ISP 112 and intermediary nodes 114 satisfy the minimum Quality of Service. Likewise, such a process may be implemented by routers 200 in each subsequent intermediary node 114 that receives the digital object for retransmission to another intermediary node 114 as the digital object travels via network 100 until the digital object reaches its selected destination node 118, although the scope of the claimed subject matter is not limited in this respect.

In one embodiment, routers 200 of ISP 112, and/or ISP 116, and/or nodes 116 may include a routing table that specifies where digital objects may be routed based on the link information between nodes 114, ISP 112, and/or ISP 116. Such routing tables may be periodically updated as packet loads and related link information between two routers 200 change over time, based at least in part on changing link information that routers 200 receive from other downstream routers 200. Furthermore, the routing tables may be updated based at least in part on the number of digital objects received over a given unit time, and/or based at least in part on the digital object information specified in the digital information objects. As the routing tables are updated, digital objects received by routers 200 may be routed to updated downstream nodes 114 according to the updated routing tables, although the scope of the claimed subject matter is not limited in this respect.

In one or more embodiments, a digital object may be sufficiently large such that it may be desirable to split the digital object into one or more sub-objects, for example at source node 110 and/or at one or more of intermediary nodes 114, where one or more of the sub-objects may be provided with its own individual routing requirements, quality of service, routing paths, and so on, and where the sub-objects may be reassembled at one or more of intermediary nodes 114 and/or one or more of destination nodes 118. Such a sub-object concept in one or more embodiments may be analogous to data transfer utilizing packets, where the sub-objects may be at a higher level of organization that a packets, but may be at a lower level of organization that the digital object itself. For example, a multimedia object may be split into a video sub-object and an audio sub-object, and/or a multimedia object may be split into a sub-objects corresponding to the scenes contained in the multimedia object, although the scope of claimed subject matter is not limited in this respect. An example of such a digital object that may be suitable for being split up into one or more smaller objects may be where the digital object is a movie. In one or more embodiments, a transmission of such an object may include a multiple input, multiple output (MIMO) transmission system and/or a spatial division, multiple access system, for example where two or more sub-objects may be transmitted in parallel in two or more links. In one particular embodiment, a network that may be suitable for splitting a digital object into one or more sub-objects may comprise at least a portion of the network operating in compliance with an Institute of Electrical and Electronics Engineers (IEEE) 802.16 type standard such as a WiMax type standard, although the scope of claimed subject matter is not limited in this respect.

Figure 4:
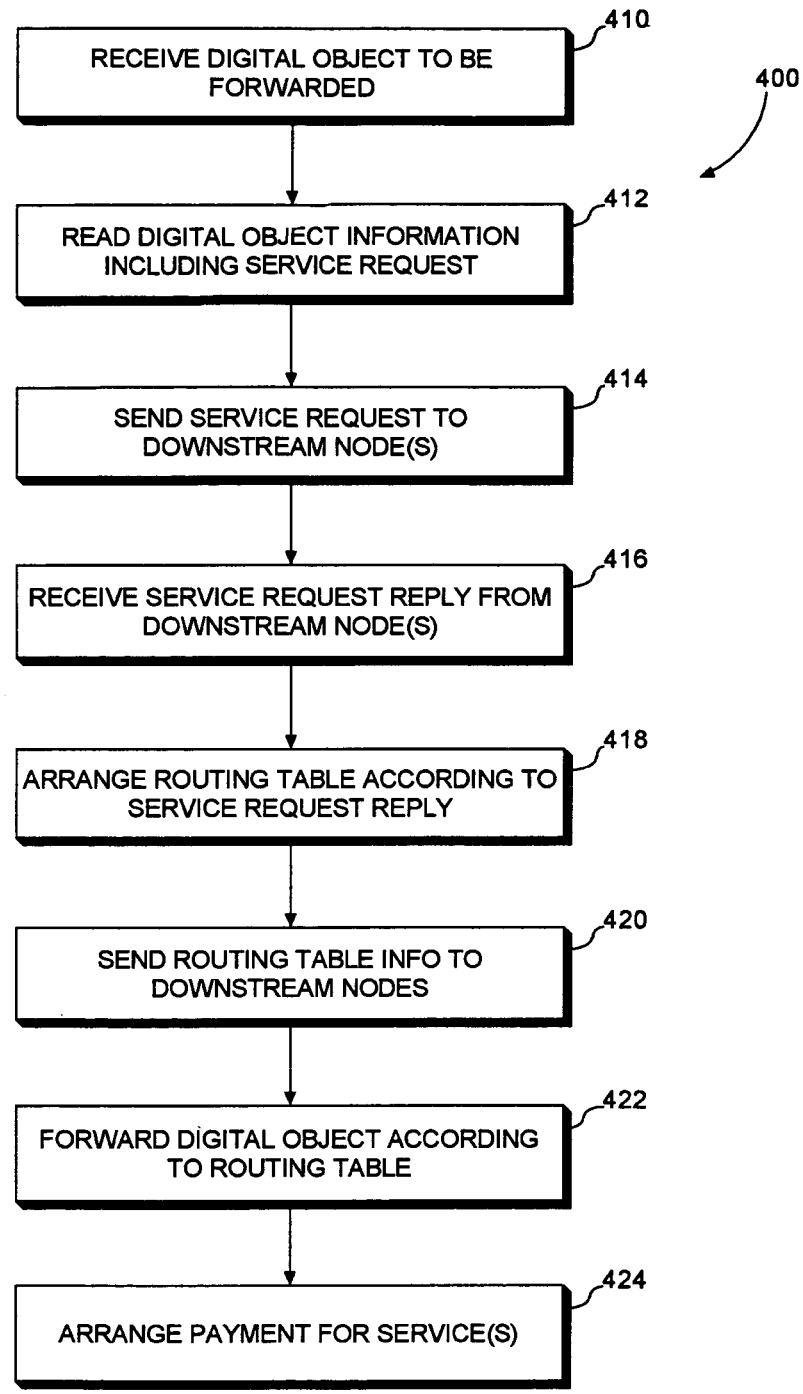
FIG. 4 is a flow diagram of a method for routing a digital object in accordance with one or more embodiments.

Referring now to FIG. 4, a flow diagram of a method for routing a digital object in accordance with one or more embodiments will be discussed. Method 400 as shown in FIG. 4 may include one or more of blocks 410 through 424 and may be implemented in any order, not necessarily in the order shown in FIG. 4. Furthermore, an implementation of method 400 may include fewer and/or more blocks than shown in FIG. 4, and the scope of the claimed subject matter is not limited in this respect. In one embodiment, method 400 may be implemented by router 200 of any one or more of ISP 112, ISP 116, and/or nodes 114. As an example of one embodiment, router 200 of ISP 112 may receive at block 410 a digital object from source node 110 to be transmitted to one or more destination nodes 118. Router 200 of ISP 112 may read digital object information at block 412 where the digital object information may be stored along with the digital object, including one or more requested services as indicated in the digital object information. In one or more alternative embodiments, the digital object information may be stored separately from the digital object, at least in part, for example as a separate object, and/or may be transmitted separately from the digital object, at least in part, although the scope of the claimed subject matter is not limited in this respect. Based on such requested services as indicated in the digital object information, router 200 of ISP 112 may send the digital object information including the requested services to one or more downstream nodes 114 at block 414. Routers 200 of downstream nodes 114 may analyze one or more parameters to determine whether such downstream nodes 114 are capable of providing and/or willing to provide one or more of the requested services, and then transmit a service request reply to router 200 of ISP 112, which may be received by router 200 of ISP 112 at block 416. Router 200 of ISP 112 may then arrange a routing table at block 418 for the transmission of the digital object via network 100 to one or more destination nodes 118 based at least in part on the service request reply received from routers 200 of downstream nodes 114. In one embodiment, router 200 of ISP 112 may arrange the routing table for the entire route, or a partial route, from source node 110 to one or more destination nodes 118. In such an embodiment, the routing table may be arranged in advance based on one or more current service request replies between nodes 114 of network 100, wherein the digital object may be transmitted to nodes 114 and forwarded to one or more destination nodes 118. The routing table optionally may be sent at block 420 to one or more affected nodes 114 to establish a prearranged transmission path or paths from source node 110 to one or more destination nodes 118, and then the digital object may be forwarded to affected nodes 114 along the prearranged transmission path or paths until the digital object reaches one or more destination nodes 118. In alternative embodiment, method 400 may be first implemented by router 200 of ISP 112, and then the digital object may be transmitted to a subsequent downstream node 114. Downstream node 114 receives the digital object, and then router 200 of the downstream node may independently execute method 400 from its vantage point, and if necessary arrange a new routing table at block 418 if the current routing table needs to be updated, or if not necessary, then forwarding the digital object according to the current routing table to a another downstream node 114 at block 422. Subsequent downstream nodes 114 likewise may optionally execute method 400 when those nodes 114 receive a digital object to be forwarded at block 410. In yet another embodiment, intermediary nodes 114 may receive updated service request replies from one or more downstream nodes 114 periodically and/or as the service request replies change over time. In such an embodiment, nodes 114 that currently have a digital object, or at least one or more packets thereof, to be forwarded may execute method 400 upon receiving updated service request replies from downstream nodes 114, upon which such current nodes 114 may update the routing table accordingly. Otherwise, if no updated service request reply is received, such current nodes 114 may forward the digital object according to the current routing table, although the scope of the claimed subject matter is not limited in this respect. In some or all of the embodiments described, above, the path or paths by which a digital object is transmitted from source node 110 to one or more destination nodes may be dynamically based at least in part on service request replies received from nodes 114 of network 100, and/or may be dynamically updated based at least in part on changing service request replies received from nodes 114 of network 100, for example as conditions of network 100 change over time, and also based at least in part on one or more requested services indicated in the digital object, and/or a combination or the requested services indicated in the digital object and the service request replies and/or changing and/or updated service request replies received from nodes 114 on network 100, although the scope of the claimed subject matter is not limited in this respect. Optionally, payment for services provided in receiving and/or forwarding the digital object may be arranged at block 424, for example where source node 110 may pay ISP 112 and/or one or more intermediary nodes 114, and/or ISP 112 may pay one or more intermediary nodes 114, for example, although the scope of the claimed subject matter is not limited in this respect.

Figure 5:
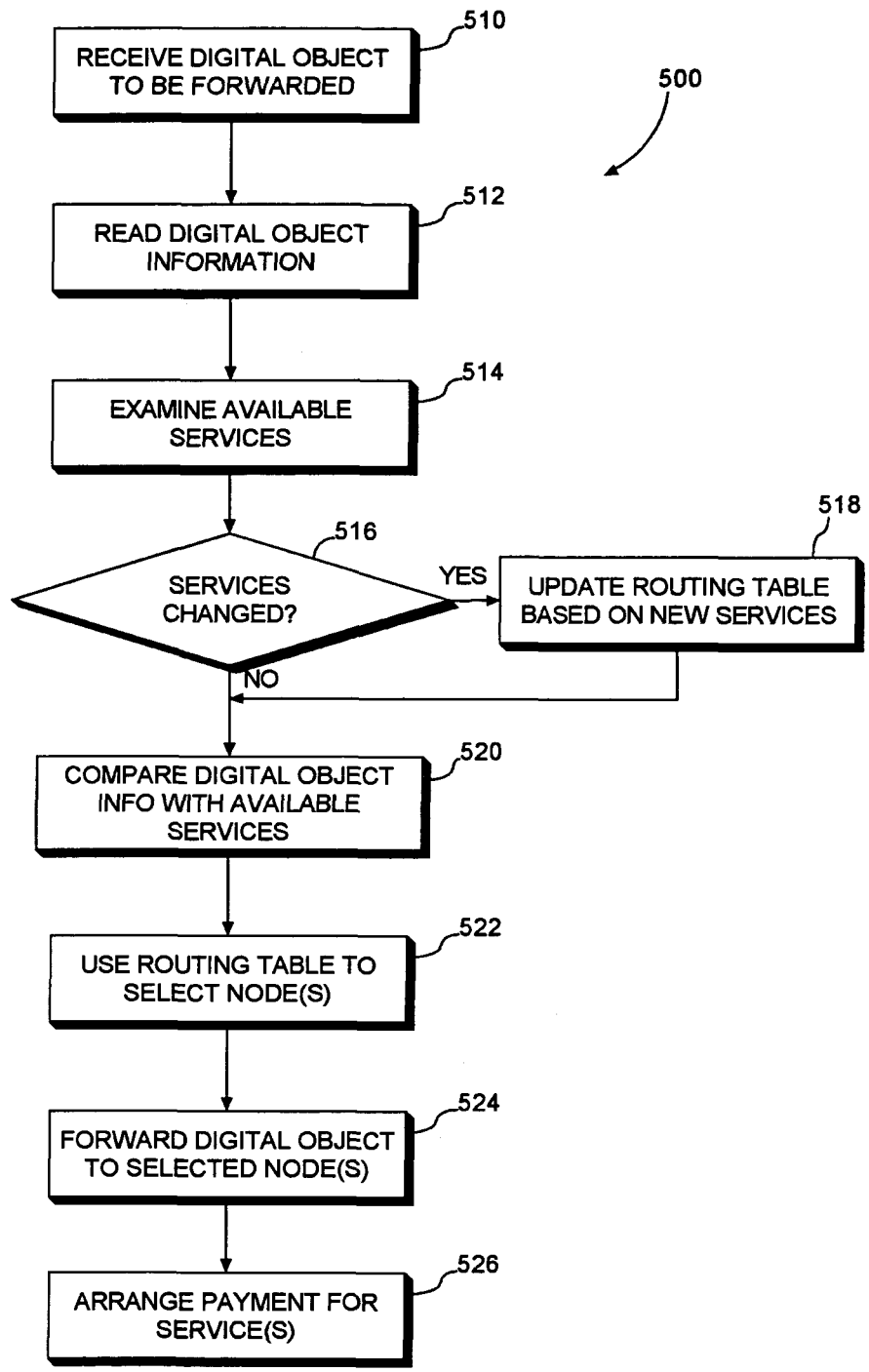
FIG. 5 is a flow diagram of a method for forwarding a digital object on a network based at least in part on available services where the available services may be changing over time in accordance with one or more embodiments.

Referring now to FIG. 5, a flow diagram of a method for forwarding a digital object on a network based at least in part on available services where the available services may be changing over time will be discussed. Method 500 as shown in FIG. 5 may include one or more of blocks 510 through 526 and may be implemented in any order, not necessarily in the order shown in FIG. 5. Furthermore, an implementation of method 500 may include fewer and/or more blocks than shown in FIG. 5, and the scope of the claimed subject matter is not limited in this respect. Method 500 shown in FIG. 5 may be executed by router 200 of ISP 112 in one or more embodiments, and may be executed by one or more nodes 114 and/or ISP 116 in one or more alternative embodiments. In one example embodiment, router 200 of ISP 112 may receive at block 510 a digital object to be forwarded to one or more destination nodes 118. Router 200 of ISP 112 may read at block 512 the digital object information that accompanies the digital object which may include one or more requested services for the transmission of the digital object on network 100. Router 200 may examine available services at block 514, for example the available services that ISP 112 and/or one or more downstream intermediary nodes 114 are capable of providing and/or willing to provide. A determination may be made at block 516 whether the available services have changed from a previous time. In the event the available services have changed, router 200 of ISP 112 may update the routing table at block 518 based at least in part on the new available services. Otherwise, the current routing table may be used. Router 200 of ISP 112 may compare at block 520 the digital object information with the available services to determine which of ISP 112 and/or downstream intermediary nodes 114 are capable of providing and/or willing to provide the requested services as specified by the digital object information. Router 200 of ISP 112 may then use the routing table at block 522 to select one or more downstream nodes 114 to which the digital object may be forwarded, and then router 200 of ISP 112 may forward the digital object at block 524 to the selected one or more downstream intermediary nodes 114.

In one embodiment, the routing table as determined by router 200 of ISP 112 may be forwarded along with the digital object, for example as digital object information, wherein downstream nodes 114 may then forward the digital object to other downstream nodes 114 according to the routing table established by router 200 of ISP 112. In alternative embodiment, routers 200 of downstream nodes 114 may independently execute method 500 when such downstream nodes 114 receive the digital object to be forwarded at block 510. In such an embodiment, in the event the available services from intermediary nodes 114 and/or further downstream intermediary nodes 114 changes, the routing table may be updated accordingly at block 518, and the digital object may be forwarded via network 100 based on the updated routing table. In a further alternative embodiment, nodes 114 on network 100 may periodically monitor available services such nodes 114 and/or other nodes 114 may provide, wherein such nodes 114 may update their own routing tables 114 accordingly, and/or such nodes 114 may monitor available services of other downstream intermediary nodes 114, and upon detecting a change in available services, such nodes 114 may update their own routing tables. In such an embodiment, nodes 114 that receive a digital object to be forwarded optionally may not necessarily make a determination at block 516 whether service quality has changed since such nodes 114 may continually and/or sporadically have already updated the routing table when a digital object is received, and in such embodiments, nodes 114 may forward the digital object according to the routing table currently stored in routers 200 of nodes 114, although the scope of the claimed subject matter is not limited in this respect. In yet another embodiment, further intermediary downstream nodes 114 may send information pertaining to available services to upstream nodes 114 when the available services change, for example based at least in part on regular traffic on network 114 and/or based at least in part on test packets and/or other service requests received from other intermediary nodes 114. In such an embodiment, such upstream nodes 114 may receive available services information from downstream nodes 114 without requiring such upstream nodes 114 to request the available services information. Alternatively, such upstream nodes 114 may request available services information from downstream nodes 114 by optionally making a determination at block 516 whether the available services have changed upon receiving a digital object to be forwarded at block 510, although the scope of the claimed subject matter is not limited in this respect. Optionally, payment for services provided in receiving and/ or forwarding the digital object may be arranged at block 526, for example where source node 110 may pay ISP 112 and/or one or more intermediary nodes 114, and/or ISP 112 may pay one or more intermediary nodes 114, for example, although the scope of the claimed subject matter is not limited in this respect.

Figure 6:
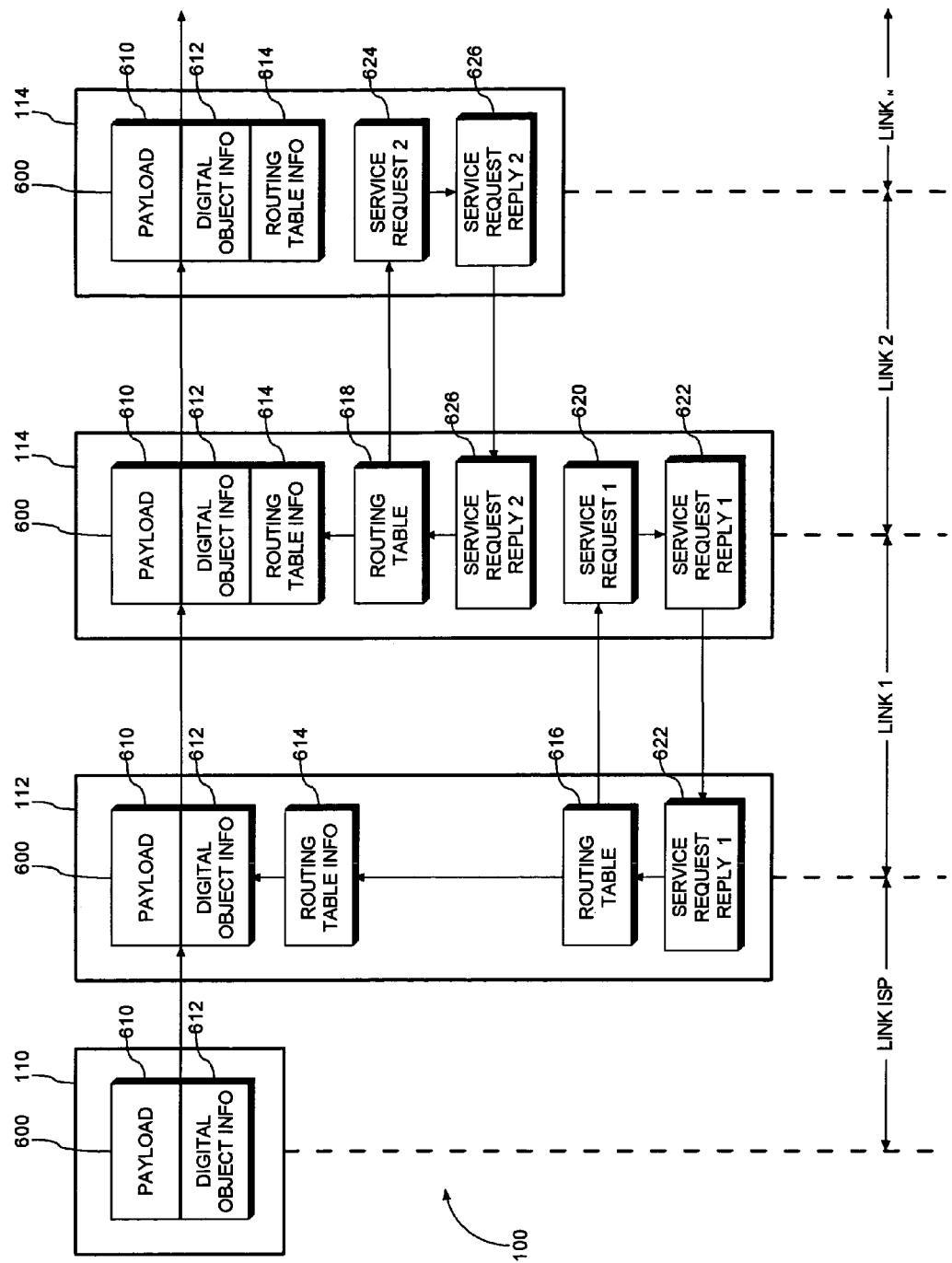
FIG. 6 is a conceptual diagram of the routing of a digital object via a network in accordance with one or more embodiments.

Referring now to FIG. 6, a conceptual diagram of the routing of a digital object via a network in accordance with one or more embodiments will be discussed. As shown in FIG. 6, digital object 600 may originate at source node 110 and may include a payload 610 and/or digital object information 612. Payload 610 may include, for example, the file, code, data, and/or content of digital object 600 that a user at source node 110 may desire to deliver to one or more destination nodes 118 as shown in FIG. 1 and FIG. 3, for example. Digital object information 612 may include, an indication of one or more requested services for transmission of digital object 600 and may further include, for example, the size of the digital object, for example in megabytes, the priority of the digital object with respect to a priority of one or more other digital objects, the time frame in which it may be desired to transmit the digital object, the link quality that may be desired between source node 110 and destination node 118, a quality of service (QoS) that may be desired between source node 112 and destination node 118, a latency parameter that may be desired between source node 112 and destination node 118, the type of information that the digital object comprises, for example text data, e-mail data, HTML data, media data, the format of the data file, and so on. Digital object information 612 may also include, for example, information about the sender, information about the recipient, information about payload 610, information about cost, payment and/or billing information, and so on. In one or more embodiments, the digital object information may be stored separately from the digital object, at least in part, for example as a separate object, and/or may be transmitted separately from the digital object, at least in part, although the scope of the claimed subject matter is not limited in this respect.

In one embodiment, a user at source node 110 may add one or more payloads 610 to digital object 600, and may also specify digital object information 612 regarding payload 610. Furthermore, digital object information 612 may also be automatically determined based on the content, format, and/or other data of payload 610. Source node 110 may then transmit digital object 600 to ISP 112 via a link (LINK ISP) between source node 110 and ISP 112 for transmission of digital object 600 to one or more destination nodes 118 via network 100. ISP 112 may receive digital object 600 and add routing table information 614 to digital object 600. In one embodiment, when ISP 112 transmits digital object 600 to one or more intermediary nodes 114, digital object 600 may include routing table information 614, for example where routing table 614 is appended to digital object 600 and/or where routing table information 614 is added to digital object information 612. Routing table information 614 may be obtained from routing table 616 of router 200, as shown in FIG. 2, of ISP 112. Routing table 616 may be based at least in part on first service request 620 transmitted from ISP 112 to downstream node 114, which in turn may determine first service request reply 622 available for a transmission (LINK 1) between ISP 114 and downstream node 114. One or more downstream nodes may transmit first service request reply 622 to ISP 112 which in turn may update routing table 616 based at least in part on first service request reply 622, which may, for example, available services for LINK 1. Routing table information 614 may then reflect routing table 616, wherein digital object 600 may include routing table information 614 that indicates to intermediary nodes 114 the path or paths that digital object 600 should take in network 100. Accordingly, ISP 112 may then forward digital object 600 to one or more intermediary nodes 114 based at least in part on the available services for link, LINK 1, between ISP 112 and node 114, although the scope of the claimed subject matter is not limited in this respect.

In a similar fashion, when digital object 600 arrives at node 114, node 114 may forward digital object 114 to downstream nodes 114 based on routing table information 614 of digital object 600. In one embodiment, routing table information 614 may be updated based at least in part on routing table 618. Routing table 618 may be determined at least in part on second service request 624 sent from one node 114 to another node 114 via another link, LINK 2. Router 200 of successive downstream node 114 may determine second service request reply 626 based at least in part on the available services for LINK 2, and then transmit second service request reply 626 to upstream node 114 wherein a router 200 of upstream node 114 may update routing table 618 based at least in part on second service request reply 626. Routing table information 614 may then reflect routing table 618, wherein digital object 600 may include routing table information 614 that indicates to intermediary nodes 114 the path or paths that digital object 600 should take in network 100. Accordingly, node 114 may then forward digital object 600 to downstream node 114 based at least in part on the available services of the link, LINK 2, between node 114 and downstream node 114, although the scope of the claimed subject matter is not limited in this respect.

Figure 7:
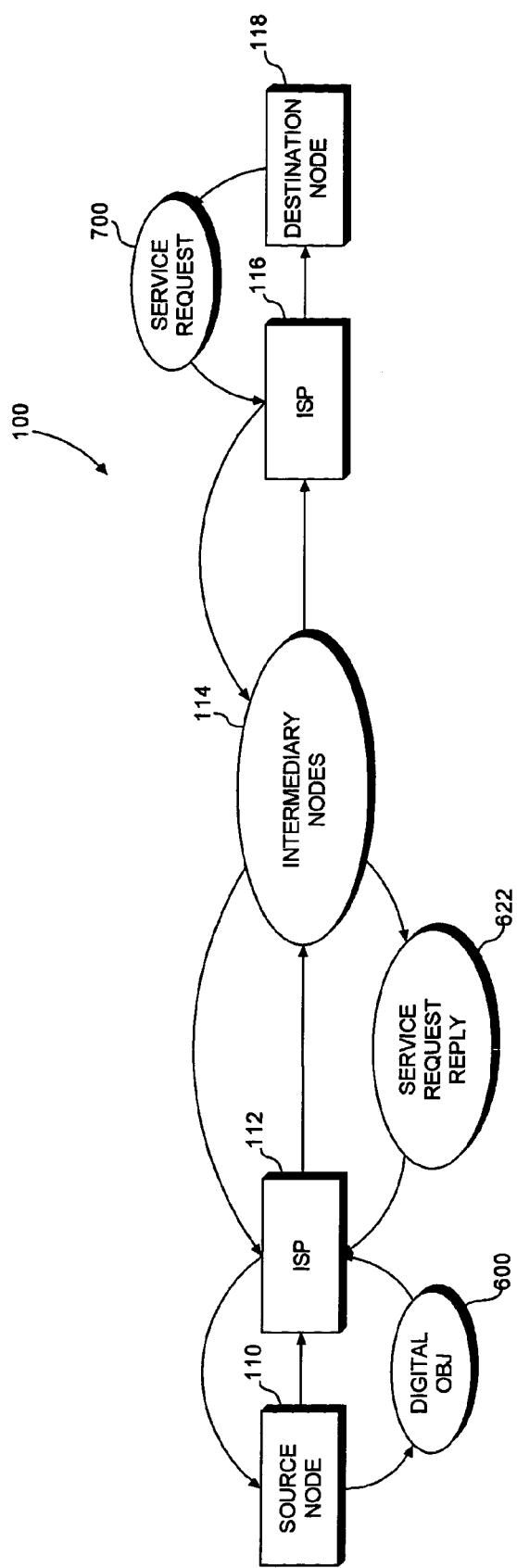
FIG. 7 is a block diagram of a network for transmitting a digital object from a source node to a destination node where the destination node and/or the destination node requests the digital object to be sent in accordance with one or more embodiments.

Referring now to FIG. 7, a block diagram of a network for transmitting a digital object from a source node to a destination node where the destination node requests the digital object to be sent in accordance with one or more embodiments will be discussed. As shown in FIG. 7, destination node 118 may send service request 700 to source node 110 via ISP 116, intermediary nodes 114, and/or ISP 112 on network 100. Service request 700 may be a request made by destination node 118 to source node 110 to transmit digital object 600 from source node 110 to destination node 118 based on one or more services. Furthermore, in yet another embodiment, any other node such as intermediary nodes and/or proxy nodes acting on behalf of another node such as source node 110, intermediary nodes 114, and/or destination node 118, for example, may request the transmission of digital object 600. Likewise, source node 110 and/or destination node 118 may together request and/or otherwise agree to a transfer of digital object 600, for example as a result of a handshake between source node 110 and/or destination node 118, and/or between at least one of source node 110 and/or destination node 118, intermediary nodes 114, and/or one or more proxy nodes. In one or more embodiments, a handshake may refer to a challenge handshake authentication protocol (CHAP) type authentication between a network server and a client device, although the scope of claimed subject matter is not limited in this respect. A handshake may occur via direct communication between two or more nodes, and/or alternatively a handshake may occur via indirect communication between two or more nodes, for example using electronic mail. In one or more embodiments, a proxy may refer to a server, node, and/or client device that may operate to provide, implement, process and/or intercept requests on behalf of given other server, node, and/or client device, and/or to operate interposed between a first server, node, and/or client device and second server, node, and/or other client device. Such a proxy may operate to provide, implement, process, and/or intercept a request on behalf of and/or in lieu of at least one of such a server, node, and/or client device, and/or may operate as an agent of at least one of such a server, node, and/or client device, and in one or more embodiments may appear to other servers, nodes, and/or client devices on network 100 as if though it were in fact the server, node, and/or client device for which such a proxy may be acting as an agent thereof. Such a proxy and/or an agent may be implemented on any one or more of source node 110, ISP 112, intermediary nodes 114, ISP 116, and/or destination-node 118, and/or on other nodes on network 100, or alternatively on a different network than network 100. In one or more embodiments, such a proxy and/or agent may be utilized to implement one or more specialized functions as part of the overall process and/or processes for transmitting digital object 600 via network 100. For example, if digital object 600 were a larger sized object that could be broken up into one or more smaller sized objects and/or packets for more efficient transmission, a proxy that specializes such breaking up of a digital object into one or more smaller objects may be utilized. Other such specialized functions of a proxy and/or agent may exist, for example compression, decompression, recombining, billing, charging, and so on. However, these are merely examples of how a proxy and/or agent may operate on network 100, and the scope of claimed subject matter is not limited in these respects.

In one embodiment, service request 700 may include, for example, a specified delivery quality and/or service level. For example, service request 700 may include an indication that digital object 600 be transmitted from source node 110 to destination node 118 at a higher level of quality of service. As another example, service request 700 may include an indication that digital object be transmitted at a predetermined time (e.g., at a specific time) and/or with a predetermined priority. When source node 110 receives service request 700, source node 110 may prepare digital object 600 for delivery to destination node 118, for example by adding one or more payloads 610 to digital object 600, and/or by adding digital object information 612 to digital object 600 where digital object information 612 may be based at least in part on service request 700. Source node 110 then transmits digital object 600 to ISP 112. Router 200 of ISP 112 may send service request 700 to one or more intermediary nodes 114 on network 100 to determine which path and/or paths may be suitable for transmission of digital object 600 to destination node 118 based at least in part on digital object information 612 contained in digital object 600, which it turn may be based at least in part on service request 700. ISP 112 may obtain first service request reply 622 from one or more nodes 114, where first service request reply 622 may include available services information for a link between ISP 112 and one or more of nodes 114, and/or available services information for a link between one or more of nodes 114 of network 100. In general, link information may be any type of digital object information. In one or more embodiments, the digital object information may be stored separately from the digital object, at least in part, for example as a separate object, and/or may be transmitted separately from the digital object, at least in part, although the scope of the claimed subject matter is not limited in this respect. ISP 112 may then arrange a routing table 616 based at least in part on first service request reply 622 and digital object information 612 reflecting at least in part service request 700, and then ISP 112 may add routing table information 614 to digital object 600. In one or more embodiments, a digital transmission form may be utilized for routing table information 614, and/or alternatively a digital transmission form may be utilized in lieu of routing table information 614, and/or in combination with routing table information 614. In one or more embodiments, routing table information 614 may comprise a digital transmission form. ISP 112 may then transmit digital object 600 via intermediary nodes 114 of network 100 based at least in part on routing table information 614 until digital object reaches ISP 116 which may then transmit digital object 600 to destination node 118, although the scope of the claimed subject matter is not limited in this respect.

Figure 8:
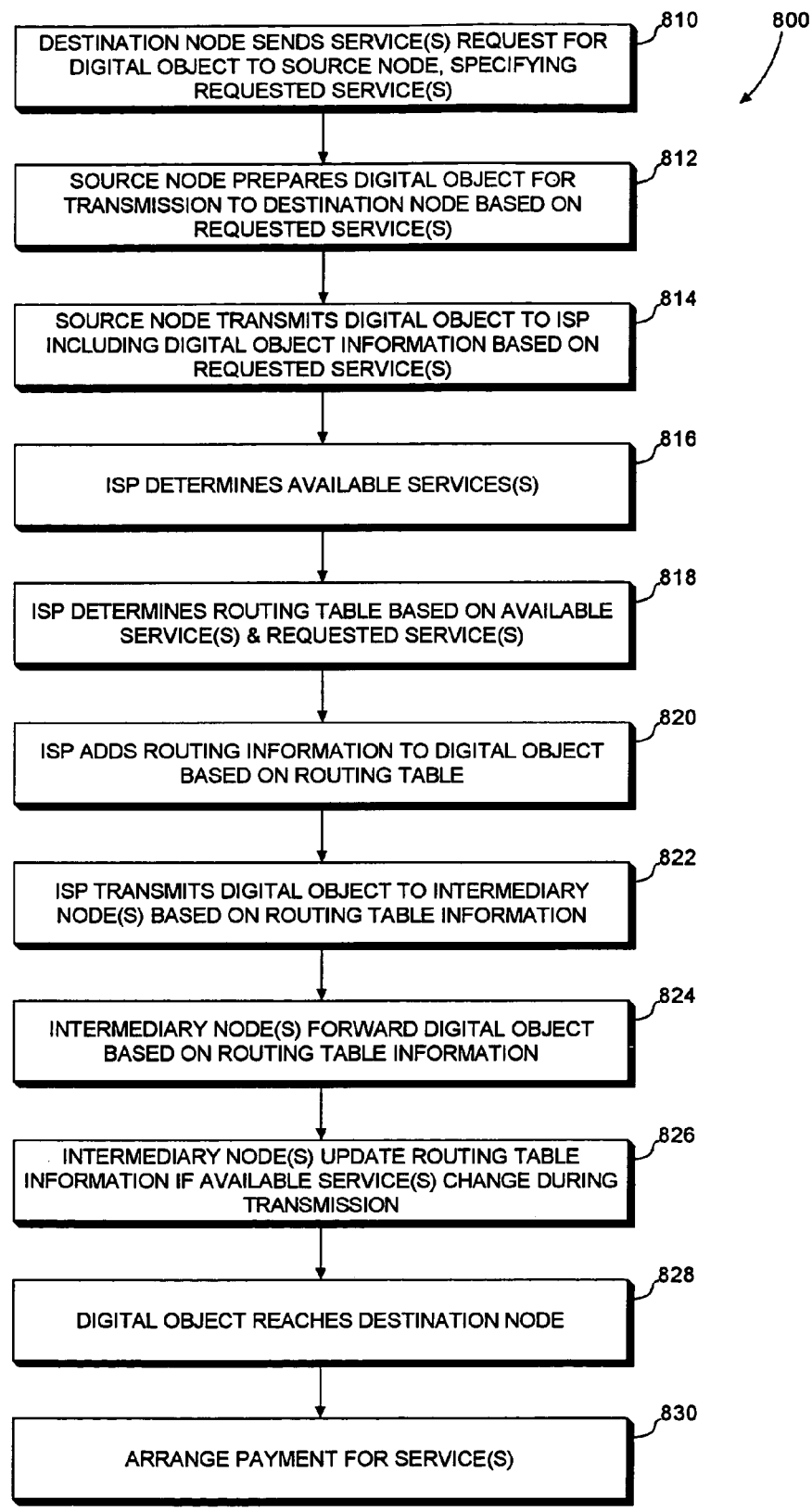
FIG. 8 is a flow diagram of a method for transmitting a digital object from a source node to a destination node where the source node and/or the destination node requests the digital object to be sent in accordance with one or more embodiments.

Referring now to FIG. 8, a flow diagram of a method for transmitting a digital object from a source node to a destination node where the destination node requests the digital object to be sent in accordance with one or more embodiments will be discussed. Method 800 as shown in FIG. 8 may include one or more of blocks 810 through 830 and may be implemented in any order, not necessarily in the order shown in FIG. 4. Furthermore, an implementation of method 800 may include fewer and/or more blocks than shown in FIG. 8, and the scope of the claimed subject matter is not limited in this respect. As shown for example with respect to FIG. 7, method 800 of FIG. 8 may be implemented via network 100 such as shown for example in FIG. 1 and FIG. 3, and may be executed via network 100 as shown in and described with respect to FIG. 8. At block 810, destination node 118 may send to source node 110 service request 700 for digital object 600 to be transmitted from source node 110 to destination node 118. Service request 700 sent by destination node 118 may include, for example, information specifying a desired level and/or quality of service. When source node 110 receives service request 700 from destination node 118, source node 110 may prepare digital object 600 at block 812 for transmission to destination node 118 based at least in part on information contained in service request 700, for example by adding one or more payloads 610 to digital object 600. At block 814, source node 110 may transmit digital object 600 to ISP 112 where digital object 600 may include digital object information 612 that is based at least in part on information contained in service request 700 such as, for example, a desired level and/or quality of service specified by source node 118. In one or more embodiments, the digital object information may be stored separately from the digital object, at least in part, for example as a separate object, and/or may be transmitted separately from the digital object, at least in part, although the scope of the claimed subject matter is not limited in this respect. ISP 112 receives digital object 600, and at block 816 ISP 112 may determine the available services from one or more intermediary nodes 114 of network 100. Based at least in part on the determined available services, ISP 112 at block 818 may determine a routing table 616 based at least in part on the determined available services and/or the desired level and/or quality of service specified by source node 118 in service request 700 that may be reflected at least in part by digital object information 612 of digital object 600. At block 820, ISP 112 may add routing table information 614 to digital object 600 where routing table information 614 may reflect at least in part routing table 616.

When routing table information 614 is added to digital object 600, at least one or more predetermined paths on network 100 may be specified by routing table information 614 to allow digital object 600 to be forwarded to destination node 118. ISP 112 may transmit digital object 600 at block 822 to one or more intermediary nodes 114 of network 100 based at least in part on routing table information 614. An intermediary node or nodes that receive digital object 600 or at least a portion and/or a packet thereof, may forward digital object 600 at block 824 to another node or nodes 114 on network 100 based at least in part on routing table information 614 contained in digital object 600 until digital object 600 reaches destination node 118 at block 828. Optionally, at block 826, one or more intermediary nodes 114 may update routing table information 614 of digital object 600 if the available services change during transmission, where updated routing table information 614 may reflect at least in part any change and/or changes to the available services, for example an available quality of service of transmission between any two or more nodes 114, although the scope of the claimed subject matter is not limited in this respect. Optionally, payment for services provided in receiving and/or forwarding the digital object may be arranged at block 830, for example where source node 110 may pay ISP 112 and/or one or more intermediary nodes 114, and/or ISP 112 may pay one or more intermediary nodes 114, for example, although the scope of the claimed subject matter is not limited in this respect.

Figure 9:
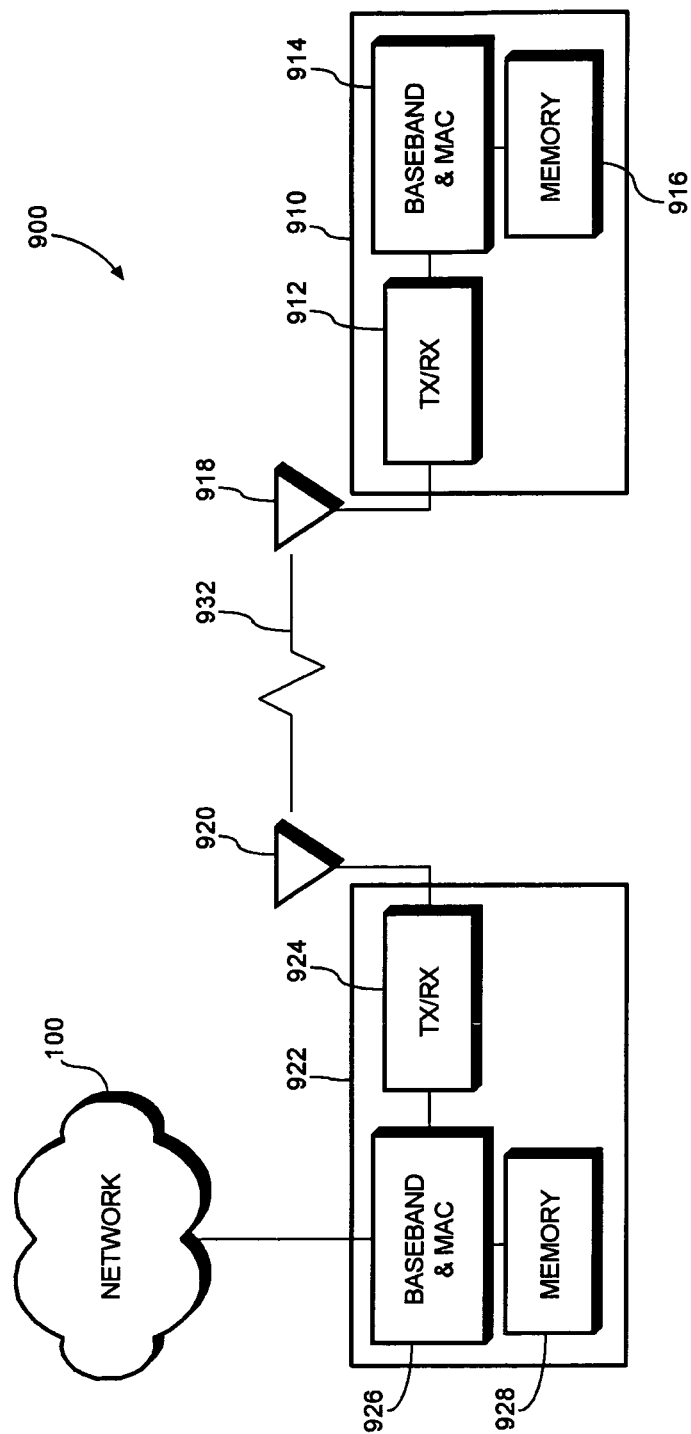
FIG. 9 is block diagram of a wireless network in accordance with or more embodiments.

Referring now to FIG. 9, a wireless network in accordance with or more embodiments will be discussed. Wireless network 900 may comprise, for example, a wireless local area network (WLAN), a wireless wide area network (WWAN), wireless metropolitan area network (WMAN), wireless personal area network (PAN), and/or a cellular telephone network. In wireless network 900 shown in FIG. 9, client 910 may be for example a mobile or remote unit such as a mobile computer and/or information handling system, a desktop computer, and/or a cellular telephone, for example. Client 910 may include a transceiver 912, and/or a transmitter (TX) and/or a receiver (RX) that may comprise an analog front end and/or radio circuitry to couple to antenna 918. Client 910 may include a processor 914 to provide baseband and/or media access control (MAC) processing functions. In one embodiment, processor 914 may comprise a single processor, and/or alternatively may comprise a baseband processor and/or an applications processor and/or a digital signal processor, although the scope of the claimed subject matter is not limited in this respect. Processor 914 may couple to memory 916 which may include volatile memory such as dynamic random-access memory (DRAM), non-volatile memory such as flash memory, and/or alternatively may include other types of storage such as a hard disk drive or optical disk drive, although the scope of the claimed subject matter is not limited in this respect. Memory 916 or a portion thereof may be included on the same integrated circuit as processor 914, and/or alternatively memory 916 or a portion thereof may be disposed on an integrated circuit and/or other medium, for example a hard disk drive, that is external to the integrated circuit of processor 914, although the scope of the claimed subject matter is not limited in this respect.

Client 910 may communicate with access point 922 via wireless communication link 932, where access point 922 may include at least one antenna 920, transceiver 924, processor 926, and/or memory 928. In an alternative embodiment, access point 922 and/or optionally client 910 may include two or more antennas 918 and/or 920, for example to provide a spatial division multiple access (SDMA) system and/or a multiple input, multiple output (MIMO) system, although the scope of the claimed subject matter is not limited in this respect. Access point 922 may couple with network 100 which may be the same network as shown in FIG. 1, FIG. 3, FIG. 6, and/or FIG. 7 for example, so that client 910 may communicate with network 100, including communicating with devices and/or nodes 114 coupled to network 100, by communicating with access point 922 via wireless communication link 932. Network 100 may include, for example, a public network such as a telephone network and/or the Internet, and/or alternatively network 100 may include a private network such as an intranet, and/or a combination of a public and/or a private network, although the scope of the claimed subject matter is not limited in this respect. Communication between client 910 and/or access point 922 may be implemented via a wireless personal area network (WPAN) standard such as a network in compliance with the WiMedia Alliance, and/or a wireless local area network (WLAN) and/or a wireless wide area network (WWAN), for example a network compliant with an Institute of Electrical and Electronics Engineers (IEEE) standard such as IEEE 802.11a, IEEE 802.11b, IEEE 802.11n, (collectively known as WiFi), IEEE 802.16 (known as WiMax), HiperLAN-II, HiperMAN, Ultra-Wideband (UWB), and so on, although the scope of the claimed subject matter is not limited in this respect. In another embodiment, communication between client 910 and/or access point 922 may be at least partially implemented via a cellular communication network compliant with a Third Generation Partnership Project (3GPP or 3G) standard, a Wideband CDMA (WCDMA) standard, Code Division Multiple access (CDMA), Single Carrier Radio Transmission Technology (1×RTT), Enhanced Data for Global Evolution (EDGE), Evolution Data Only (EV-DO), Fast Low-latency Access with Seamless Handoff Orthogonal Frequency Division Multiplexing (Flash-OFDM), General Packet Radio Service (GPRS), Global System for Mobile Communications (GSM), and/or Universal Mobile Telecommunications System (UMTS), and/or the like, although the scope of the claimed subject matter is not limited in this respect. In one or more embodiments, client 910 may correspond to source node 110 and/or destination node 118. Likewise, access point 922 may correspond to ISP 112 and/or ISP 116, and/or one or more of nodes 114. In one particular embodiment, access point 922 may be implemented in router 200 where router 200 may be a wireless router and/or wireless access point, for example. Similarly, access point 922 may be a base station of a cellular telephone network, for example Node B equipment of a UMTS Radio Access Network (RAN) and/or UMTS terrestrial radio access network (UTRAN). However, these are merely examples of a wireless network, and the scope of the claimed subject matter is not limited in this respect.

Figure 10:
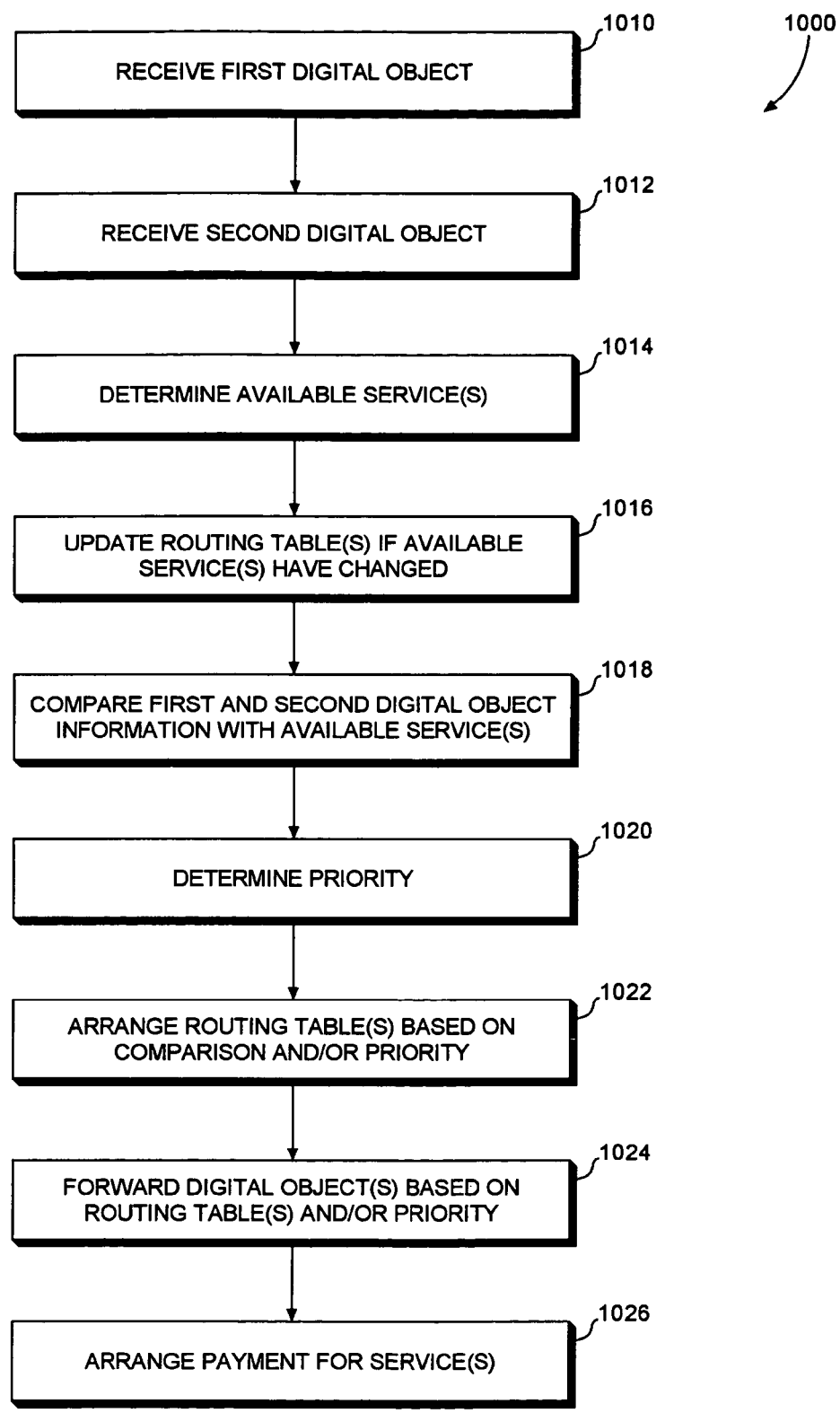
FIG. 10 is a flow diagram of a method for routing two or more digital objects in accordance with one or more embodiments.

Referring now to FIG. 10, a flow diagram of a method for routing two or more digital objects in accordance with one or more embodiments will be discussed. Method 1000 as shown in FIG. 10 may include one or more of blocks 1010 through 1026 and may be implemented in any order, not necessarily in the order shown in FIG. 10. Furthermore, an implementation of method 1000 may include fewer and/or more blocks than shown in FIG. 10, and the scope of the claimed subject matter is not limited in this respect. In one embodiment, ISP 112 may receive a first digital object at block 1010 to be transmitted via network 100 to one or more destination nodes 118. ISP 112 may also receive a second digital object at block 1012 also to be transmitted via network 100 to one or more destination nodes 118, which may be the same destination nodes 118 in whole or in part that the first digital object is to be transmitted to, and/or one or more other destination nodes 118. ISP 112 may receive the second digital object from the same source node 110 it receives the first digital object from, or it may receive the second digital object from another source node 110. In an alternative embodiment, one or more source nodes 114 and/or another ISP 116 may also implement method 1000 in the like manner as ISP 112. At block 1014, ISP 112 may determine available services that ISP 112 may provide itself, and/or available services that one or more nodes 114 on network 100 may provide. If the available services have changed from a previous query of available services, router 200 of ISP 112 may update one or more routing tables accordingly at block 1016. At block 1018, ISP 112 may compare the digital object information of the first digital object, the digital object information of the second digital object, and/or the available services. Optionally, at block 1020 ISP 112 may also compare the requested services, such as the priority and/or quality of service, specified in the digital object information of the first digital object with the requested services specified in the digital object information of the second digital object. In one or more embodiments, the digital object information may be stored separately from the digital object, at least in part, for example as a separate object, and/or may be transmitted separately from the digital object, at least in part, although the scope of the claimed subject matter is not limited in this respect. At block 1022, ISP 112 may arrange one or more routing tables for the first digital object and/or the second digital object based on the comparison of block 1018 and/or based on the requested services at block 1020 in view of the available services determined at block 1014. In one embodiment, if the level of requested services of one digital object is greater than the level of requested services of the other digital object, the digital object having the higher level of requested services may be assigned a transmission path on network 100 having a higher level of available services. In another embodiment, if the level of requested services of one digital object is the same as and/or comparable to the level of requested services of the other digital object, then the two or more digital objects may be assigned the same and/or similar transmission path in network 100 having the same level of requested services. In another embodiment, two or more digital objects may be assigned different transmission paths in network 100, and may be assigned different routing tables. At block 1024, ISP 112 may forward the first digital object and the second digital object based at least in part on the routing tables assigned to the digital objects, and/or based at least in part on the determined available services on network 100. Optionally, payment for services provided in receiving and/or forwarding the digital object may be arranged at block 1026, for example where source node 110 may pay ISP 112 and/or one or more intermediary nodes 114, and/or ISP 112 may pay one or more intermediary nodes 114, for example, although the scope of the claimed subject matter is not limited in this respect. However, these are merely examples of how two or more digital objects may be routed via network 100, and the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that digital object routing based on a service request and/or many of its attendant advantages will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    receiving a digital transmission form from a source node, wherein said receiving is performed by a network device within a network, wherein the digital transmission form corresponds to a digital object to be forwarded from the source node to a destination node, wherein the digital transmission form is wholly separate from the digital object, wherein the digital transmission form specifies at least one requested service to be performed in transmitting the digital object from the network device to the destination node, and wherein the at least one requested service specifies information relating to a time of transmission of the digital object by the network device;
    determining an availability of one or more nodes within the network to provide the at least one requested service, wherein said determining is performed by the network device;
    receiving, at the network device, at least one portion of the digital object from the source node; and
    transmitting, from the network device, the at least one portion of the digital object over the network to the one or more nodes based at least in part on the availability of the one or more nodes to provide the at least one requested service.

2. The method as claimed in claim 1, wherein the at least one requested service specified by the digital transmission form includes information specifying a time interval for delivery of the digital object.

3. The method as claimed in claim 1, further comprising the network device maintaining a routing table to include information indicative of nodes in the network available to provide the at least one requested service; and
    wherein transmitting the at least one portion of the digital object to the one or more nodes is based at least in part on the information included in the routing table indicating the one or more nodes are available to provide the at least one requested service.

4. The method as claimed in claim 3, further comprising detecting a change in the availability of a particular node in the network to provide the at least one requested service; and
    updating the information in the routing table to indicate the change in the availability of the particular node to provide the at least one requested service;
    wherein said detecting and said updating are performed by the network device.

5. The method as claimed in claim 1, wherein the determining the availability of one or more nodes to provide the at least one requested service includes the network device:
    sending a service request to one or more downstream nodes; and
    receiving a service request reply from at least one of the one or more downstream nodes, wherein the service request reply includes information indicative of whether the at least one downstream node is available to provide the requested service.

6. The method as claimed in claim 1, further comprising the source node arranging payment to the one or more nodes for providing the at least one requested service.

7. The method of claim 6, wherein the arranging payment is based, at least in part, on bartering information included in a payment request sent to the one or more nodes.

8. The method of claim 1, wherein the at least one requested service specified by the digital transmission form includes a request that the one or more nodes provide a specified quality of service level.

9. The method of claim 1, wherein the at least one requested service specified by the digital transmission form includes a request that the one or more nodes store the at least one portion of the digital object for a predetermined period of time.

10. The method of claim 1, wherein the availability of the one or more nodes within the network to provide the at least one requested service is based, at least in part, on available network bandwidth at the one or more nodes.

11. The method of claim 1, further comprising the network device transmitting one or more other portions of the digital object to one or more other nodes based at least in part on an inability of the one or more nodes to continue to provide the at least one requested service.

12. The method of claim 1, wherein the time of transmission includes a specific time for the transmission of the digital object by the network device.

13. The method of claim 1, wherein the time of transmission includes a time frame for the transmission of the digital object by the network device.

14. An apparatus, comprising:
means for receiving a digital transmission form from a source node within a network, wherein the digital transmission form corresponds to a digital object to be forwarded from the source node to a destination node, wherein the digital transmission form is wholly separate from the digital object, wherein the digital transmission form specifies at least one requested service to be performed in transmitting the digital object from a network device to the destination node, and wherein the at least one requested service specifies information relating to a time of transmission of the digital object by the network device;
means for determining an availability of one or more nodes within the network to provide the at least one requested service; and
means for receiving at least one portion of the digital object and transmitting the received at least one portion to the one or more nodes, wherein the transmitting is based at least in part on the availability of the one or more nodes to provide the at least one requested service.

15. The apparatus as claimed in claim 14, wherein the at least one requested service specified by the digital transmission form includes information specifying a time interval for delivery of the digital object.

16. The apparatus as claimed in claim 14, further comprising means for maintaining a routing table to include information indicative of nodes in the network available to provide the at least one requested service; and
wherein the transmitting is based at least in part on the information included in the routing table indicating the one or more nodes are available to provide the at least one requested service.

17. The apparatus as claimed in claim 14, further comprising means for determining there is a change in the availability of a particular node in the network to provide the at least one requested service; and
means for updating the information in a routing table to indicate the change; and wherein the transmitting is based at least in part on the information included in the routing table indicating the one or more nodes are available to provide the at least one requested service.

18. The apparatus as claimed in claim 14, further comprising means for arranging payment for the at least one requested service.

19. An apparatus, comprising:
a computing platform including a processor and a computer-readable storage medium having program instructions stored thereon that, if executed by the processor, cause the computing platform to:
receive a digital transmission form from a source node in a network, wherein the digital transmission form corresponds to a digital object to be forwarded from the source node to a destination node, wherein the digital transmission form is wholly separate from the digital object, wherein the digital transmission form specifies at least one requested service to be performed in transmitting the digital object from the computing platform to the destination node, and wherein the at least one requested service specifies information relating to a time of transmission of the digital object by the computing platform;
determine an availability of one or more nodes within the network to provide the at least one requested service;
receive at least one portion of the digital object from the source node; and
transmit the digital object over the network to the one or more nodes based at least in part on the availability of the one or more nodes to provide the at least one requested service.

20. The apparatus as claimed in claim 19, wherein the at least one requested service specified by the digital transmission form includes information specifying a time interval for delivery of the digital object to arrive at a destination node within the network.

21. The apparatus as claimed in claim 19, wherein the instructions, if executed by the processor, cause the computing platform to:
maintain a routing table to include information indicative of nodes in the network available to provide the at least one requested service; and
wherein the instructions cause the computing platform to transmit the at least one portion of the digital object to the one or more nodes based at least in part on the information included in the routing table indicating the one or more nodes are available to provide the at least one requested service.

22. The apparatus as claimed in claim 21, wherein the instructions, if executed by the processor, cause the computing platform to:
detect a change in the availability of a particular node on the network to provide the at least one requested service; and
update the information in the routing table to indicate the change.

23. The apparatus as claimed in claim 19, wherein the instructions, if executed by the processor, cause the computing platform being to:
send a service request to one or more downstream nodes; and
receive a service request reply from at least one of the one or more downstream nodes, wherein the service request reply includes information indicative of whether the at least one downstream node is available to provide the requested service.

24. The apparatus as claimed in claim 19, wherein the instructions, if executed by the processor, cause the computing platform to arrange payment to the one or more nodes for providing the at least one requested service.

25. The apparatus of claim 19, wherein the at least one requested service specified by the digital transmission form includes a request that the one or more nodes determine whether one or more other nodes within the network are available to provide the at least one requested service.

26. The apparatus of claim 19, wherein the at least one requested service specified by the digital transmission form includes a request that the one or more nodes provide a specified quality of service level.

27. The apparatus of claim 19, wherein the at least one requested service specified by the digital transmission form includes a request that the one or more nodes store the at least one portion of the digital object for a predetermined period of time.

28. The apparatus of claim 19, wherein the at least one requested service specified by the digital transmission form includes a request to provide a priority level for transmission of the digital object.

29. An article of manufacture including a computer-readable storage medium having instructions stored thereon that, if executed by a computing device, cause the computing device to perform a method comprising:
receiving a digital transmission form from a source node in a network, wherein the digital transmission form corresponds to a digital object to be forwarded from the source node to a destination node, wherein the digital transmission form is wholly separate from the digital object, wherein the digital transmission form specifies at least one requested service to be performed in transmitting the digital object from the computing device to the destination node, and wherein the at least one requested service specifies information relating to a time of transmission of the digital object by the computing device;
determining an availability of one or more nodes within the network to provide the at least one requested service;
receiving at least one portion of the digital object from the source node; and
transmitting the at least one portion of the digital object over the network to the one or more nodes based at least in part on the availability of the one or more nodes to provide the at least one requested service.

30. The article of manufacture as claimed in claim 29, wherein the at least one requested service specified by the digital transmission form includes information specifying a time interval for delivery of the digital object.

31. The article of manufacture as claimed in claim 29, wherein the method further comprises maintaining a routing table to include information indicative of nodes in the network available to provide the at least one requested service; and
wherein transmitting the at least one portion of the digital object to the one or more nodes is based at least in part on the information included in the routing table indicating the one or more nodes are available to provide the at least one requested service.

32. The article of manufacture as claimed in claim 31, wherein the method further comprises detecting a change in the availability of a particular node in the network to provide the at least one requested service; and
updating the information in the routing table to indicate the change in the availability of the particular node to provide the at least one requested service.

33. The article of manufacture as claimed in claim 32, wherein the detecting includes the computing device:
sending a service request to one or more downstream nodes; and
receiving a service request reply from at least one of the one or more downstream nodes, wherein the service request reply includes information indicative of whether the at least one downstream node is available to provide the requested service.

34. The article of manufacture as claimed in claim 29, wherein the method further comprises arranging payment to the one or more nodes for providing the at least one requested service.

35. The article of manufacture of claim 29, wherein the digital object includes a plurality of sub-objects, at least one of which is a video sub-object.

36. The article of manufacture of claim 29, wherein the digital object includes a plurality of sub-objects, at least one of which is an audio sub-object.

37. The article of manufacture of claim 29, wherein the method further comprises the computing device transmitting one or more other portions of the digital object to one or more other nodes based at least in part on an inability of the one or more nodes to continue to provide the at least one requested service.

38. The article of manufacture of claim 29, wherein the at least one requested service specified by the digital transmission form includes a request to provide a priority level for transmission of the digital object.

39. The article of manufacture of claim 29, wherein the at least one requested service specified by the digital transmission form includes a request that the one or more nodes provide a specified quality of service level.

40. A method, comprising:
receiving a digital transmission form from a source node, wherein said receiving is performed by a network device within a network, wherein the digital transmission form corresponds to a digital object to be forwarded from the source node to a destination node, wherein the digital transmission form specifies at least one requested service to be performed in transmitting the digital object from the network device to the destination node, and wherein the at least one requested service specifies a time constraint for delivery of the digital object at the destination node;
determining an availability of one or more nodes within the network to provide the at least one requested service, wherein said determining is performed by the network device;
receiving, at the network device, at least one portion of the digital object from the source node; and
transmitting, from the network device, the at least one portion of the digital object over the network to the one or more nodes based at least in part on the availability of the one or more nodes to provide the at least one requested service.

41. An article of manufacture including a computer-readable storage medium having instructions stored thereon that, if executed by a computing device, cause the computing device to perform a method comprising:
receiving a digital transmission form from a source node in a network, wherein the digital transmission form corresponds to a digital object to be forwarded from the source node to a destination node, wherein the digital transmission form specifies at least one requested service to be performed in transmitting the digital object from the computing device to the destination node, and wherein the at least one requested service specifies a time constraint for delivery of the digital object at the destination node;

determining an availability of one or more nodes within the network to provide the at least one requested service;

receiving at least one portion of the digital object from the source node; and transmitting the at least one portion of the digital object over the network to the one or more nodes based at least in part on the availability of the one or more nodes to provide the at least one requested service.

* * * * *